United States Patent
Kirby et al.

(10) Patent No.: US 8,854,224 B2
(45) Date of Patent: Oct. 7, 2014

(54) CONVEYING DEVICE INFORMATION RELATING TO WIRELESS CHARGING

(75) Inventors: Miles Alexander Lyell Kirby, San Diego, CA (US); Virginia Walker Keating, San Diego, CA (US); Rinat Burdo, La Jolla, CA (US); Ernest T. Ozaki, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 12/572,371

(22) Filed: Oct. 2, 2009

(65) Prior Publication Data
US 2010/0201533 A1 Aug. 12, 2010

Related U.S. Application Data

(60) Provisional application No. 61/151,290, filed on Feb. 10, 2009, provisional application No. 61/152,363, filed on Feb. 13, 2009.

(51) Int. Cl.
*G08B 21/00* (2006.01)
*H02J 7/02* (2006.01)

(52) U.S. Cl.
CPC ..................................... *H02J 7/025* (2013.01)
USPC ............... 340/636.1; 340/870.37; 340/693.1

(58) Field of Classification Search
USPC ............. 340/636.1, 870.37, 636.11, 636.12, 340/636.19, 679–680, 683, 691.6, 692, 340/693.1
See application file for complete search history.

(56) References Cited

U.S. PATENT DOCUMENTS

| | | |
|---|---|---|
| 3,633,109 A | 1/1972 | Schulz |
| 4,684,869 A | 8/1987 | Kobayashi et al. |
| 4,802,080 A | 1/1989 | Bossi et al. |
| 5,201,066 A | 4/1993 | Kim |
| 5,287,112 A | 2/1994 | Schuermann |
| 5,520,892 A | 5/1996 | Bowen |
| 5,539,394 A | 7/1996 | Cato et al. |
| 5,619,530 A | 4/1997 | Cadd et al. |
| 5,790,080 A | 8/1998 | Apostolos |
| 5,956,626 A | 9/1999 | Kaschke et al. |

(Continued)

FOREIGN PATENT DOCUMENTS

| | | |
|---|---|---|
| CN | 1426170 A | 6/2003 |
| CN | 1460226 A | 12/2003 |

(Continued)

OTHER PUBLICATIONS

International Search Report and Written Opinion—PCT/US2010/023796, International Search Authority—European Patent Office—May 10, 2010.

(Continued)

*Primary Examiner* — Daniel Previl
(74) *Attorney, Agent, or Firm* — Knobbe Martens Olson & Bear LLP

(57) ABSTRACT

Exemplary embodiments are directed to wireless charging. A charging device configured to wirelessly charge one or more electronic devices may comprise at least one charging region, wherein each charging region of the at least one is configured for placement of one or more electronic devices. The charging device may further include an interface configured to convey information relating at least one electronic device of the one or more electronic devices placed within the at least one charging region.

37 Claims, 16 Drawing Sheets

(56) References Cited

U.S. PATENT DOCUMENTS

| | | | |
|---|---|---|---|
| 5,963,144 | A | 10/1999 | Kruest |
| 6,151,500 | A * | 11/2000 | Cardina et al. ............. 455/435.2 |
| 6,195,562 | B1 | 2/2001 | Pirhonen et al. |
| 6,263,247 | B1 | 7/2001 | Mueller et al. |
| 6,344,828 | B1 | 2/2002 | Grantz et al. |
| 6,489,745 | B1 | 12/2002 | Koreis |
| 6,600,931 | B2 | 7/2003 | Sutton et al. |
| 6,608,550 | B2 | 8/2003 | Hayashi et al. |
| 6,664,770 | B1 | 12/2003 | Bartels |
| 6,683,438 | B2 | 1/2004 | Park et al. |
| 6,690,264 | B2 | 2/2004 | Dalglish |
| 6,760,578 | B2 | 7/2004 | Rotzoll |
| 6,809,498 | B2 | 10/2004 | Nakamura et al. |
| 6,853,629 | B2 | 2/2005 | Alamouti et al. |
| 6,906,495 | B2 | 6/2005 | Cheng et al. |
| 6,967,462 | B1 | 11/2005 | Landis |
| 6,970,142 | B1 | 11/2005 | Pleva et al. |
| 7,069,086 | B2 | 6/2006 | Von Arx |
| 7,142,811 | B2 | 11/2006 | Terranova et al. |
| 7,146,139 | B2 | 12/2006 | Nevermann |
| 7,164,255 | B2 | 1/2007 | Hui |
| 7,193,578 | B1 | 3/2007 | Harris et al. |
| 7,243,855 | B2 | 7/2007 | Matsumoto et al. |
| 7,248,841 | B2 | 7/2007 | Agee et al. |
| 7,356,588 | B2 * | 4/2008 | Stineman et al. ............. 709/224 |
| 7,375,492 | B2 | 5/2008 | Calhoon et al. |
| 7,378,817 | B2 | 5/2008 | Calhoon et al. |
| 7,382,260 | B2 | 6/2008 | Agarwal et al. |
| 7,382,636 | B2 | 6/2008 | Baarman et al. |
| 7,428,438 | B2 | 9/2008 | Parramon et al. |
| 7,478,108 | B2 | 1/2009 | Townsend et al. |
| 7,480,907 | B1 * | 1/2009 | Marolia et al. ................ 717/174 |
| 7,499,722 | B2 | 3/2009 | McDowell et al. |
| 7,521,890 | B2 | 4/2009 | Lee et al. |
| 7,522,878 | B2 | 4/2009 | Baarman |
| 7,538,666 | B2 | 5/2009 | Campman |
| 7,539,465 | B2 | 5/2009 | Quan |
| 7,554,316 | B2 | 6/2009 | Stevens et al. |
| 7,561,050 | B2 | 7/2009 | Bhogal et al. |
| 7,565,108 | B2 | 7/2009 | Kotola et al. |
| 7,576,657 | B2 | 8/2009 | Duron et al. |
| 7,579,913 | B1 | 8/2009 | Cheng et al. |
| 7,598,704 | B2 | 10/2009 | Taniguchi et al. |
| 7,605,496 | B2 | 10/2009 | Stevens et al. |
| 7,609,157 | B2 | 10/2009 | McFarland |
| 7,626,544 | B2 | 12/2009 | Smith et al. |
| 7,629,886 | B2 | 12/2009 | Steeves |
| 7,642,918 | B2 | 1/2010 | Kippelen et al. |
| 7,646,343 | B2 | 1/2010 | Shtrom et al. |
| 7,663,490 | B2 | 2/2010 | Dishongh |
| 7,675,403 | B2 | 3/2010 | Quan et al. |
| 7,741,734 | B2 | 6/2010 | Joannopoulos et al. |
| 7,778,224 | B2 | 8/2010 | Hayashi et al. |
| 7,792,553 | B2 | 9/2010 | Fukui et al. |
| 7,793,121 | B2 | 9/2010 | Lawther et al. |
| 7,812,481 | B2 | 10/2010 | Iisaka et al. |
| 7,831,757 | B2 | 11/2010 | Habuto et al. |
| 7,844,306 | B2 | 11/2010 | Shearer et al. |
| 7,868,837 | B2 | 1/2011 | Yun et al. |
| 7,924,751 | B2 | 4/2011 | Dean |
| 7,952,322 | B2 | 5/2011 | Partovi et al. |
| 7,994,880 | B2 | 8/2011 | Chen et al. |
| 8,004,118 | B2 | 8/2011 | Kamijo et al. |
| 8,073,387 | B2 | 12/2011 | Maslennikov et al. |
| 8,115,448 | B2 | 2/2012 | John |
| 8,169,185 | B2 | 5/2012 | Partovi et al. |
| 8,432,293 | B2 | 4/2013 | Symons |
| 8,611,815 | B2 | 12/2013 | Mohammadian et al. |
| 8,614,526 | B2 | 12/2013 | Cook et al. |
| 8,629,650 | B2 | 1/2014 | Mohammadian et al. |
| 2001/0000960 | A1 | 5/2001 | Dettloff |
| 2001/0046205 | A1 | 11/2001 | Easton et al. |
| 2002/0041624 | A1 | 4/2002 | Kim et al. |
| 2002/0154705 | A1 | 10/2002 | Walton et al. |
| 2002/0158512 | A1 | 10/2002 | Mizutani et al. |
| 2004/0002835 | A1 | 1/2004 | Nelson |
| 2004/0041669 | A1 | 3/2004 | Kawai |
| 2004/0116952 | A1 | 6/2004 | Sakurai et al. |
| 2004/0130425 | A1 | 7/2004 | Dayan et al. |
| 2004/0130916 | A1 | 7/2004 | Baarman |
| 2004/0145342 | A1 | 7/2004 | Lyon |
| 2004/0154652 | A1 | 8/2004 | Karapetyan |
| 2004/0166869 | A1 | 8/2004 | Laroia et al. |
| 2004/0180637 | A1 | 9/2004 | Nagai et al. |
| 2004/0227057 | A1 | 11/2004 | Tuominen et al. |
| 2004/0245473 | A1 | 12/2004 | Takayama et al. |
| 2005/0068019 | A1 | 3/2005 | Nakamura et al. |
| 2005/0083881 | A1 | 4/2005 | Ohwada |
| 2005/0116683 | A1 | 6/2005 | Cheng et al. |
| 2005/0151511 | A1 | 7/2005 | Chary |
| 2005/0156560 | A1 | 7/2005 | Shimaoka et al. |
| 2005/0205679 | A1 | 9/2005 | Alihodzic |
| 2005/0219132 | A1 | 10/2005 | Charrat |
| 2005/0220057 | A1 | 10/2005 | Monsen |
| 2005/0225437 | A1 | 10/2005 | Shiotsu et al. |
| 2005/0239018 | A1 | 10/2005 | Green et al. |
| 2006/0084392 | A1 | 4/2006 | Marholev et al. |
| 2006/0113955 | A1 | 6/2006 | Nunally |
| 2006/0114102 | A1 | 6/2006 | Chang et al. |
| 2006/0131193 | A1 | 6/2006 | Sherman |
| 2006/0184705 | A1 | 8/2006 | Nakajima |
| 2006/0197652 | A1 | 9/2006 | Hild et al. |
| 2006/0202665 | A1 | 9/2006 | Hsu |
| 2006/0220863 | A1 | 10/2006 | Koyama |
| 2006/0244568 | A1 | 11/2006 | Tong et al. |
| 2007/0001816 | A1 | 1/2007 | Lindley et al. |
| 2007/0004456 | A1 | 1/2007 | Shimada |
| 2007/0004466 | A1 * | 1/2007 | Haartsen ..................... 455/572 |
| 2007/0017804 | A1 | 1/2007 | Myrtveit et al. |
| 2007/0021140 | A1 | 1/2007 | Keyes et al. |
| 2007/0026799 | A1 | 2/2007 | Wang et al. |
| 2007/0029965 | A1 | 2/2007 | Hui |
| 2007/0072474 | A1 | 3/2007 | Beasley et al. |
| 2007/0080804 | A1 | 4/2007 | Hirahara et al. |
| 2007/0090790 | A1 | 4/2007 | Hui |
| 2007/0091006 | A1 | 4/2007 | Thober et al. |
| 2007/0109708 | A1 | 5/2007 | Hussman et al. |
| 2007/0158438 | A1 | 7/2007 | Fukuda et al. |
| 2007/0165475 | A1 | 7/2007 | Choi et al. |
| 2007/0171811 | A1 | 7/2007 | Lee et al. |
| 2007/0222681 | A1 | 9/2007 | Greene et al. |
| 2007/0279002 | A1 | 12/2007 | Partovi |
| 2007/0287508 | A1 | 12/2007 | Telefus |
| 2007/0290654 | A1 | 12/2007 | Govari et al. |
| 2007/0296393 | A1 | 12/2007 | Malpas et al. |
| 2008/0014897 | A1 | 1/2008 | Cook et al. |
| 2008/0030324 | A1 | 2/2008 | Bekritsky et al. |
| 2008/0054638 | A1 | 3/2008 | Greene et al. |
| 2008/0058029 | A1 | 3/2008 | Sato et al. |
| 2008/0066979 | A1 | 3/2008 | Carter |
| 2008/0067874 | A1 | 3/2008 | Tseng |
| 2008/0079396 | A1 | 4/2008 | Yamazaki et al. |
| 2008/0091350 | A1 | 4/2008 | Smith et al. |
| 2008/0114255 | A1 | 5/2008 | Schwartz et al. |
| 2008/0116847 | A1 | 5/2008 | Loke et al. |
| 2008/0122297 | A1 | 5/2008 | Arai |
| 2008/0157711 | A1 * | 7/2008 | Chiang et al. ................. 320/101 |
| 2008/0165074 | A1 | 7/2008 | Terry |
| 2008/0174266 | A1 | 7/2008 | Tamura |
| 2008/0174267 | A1 | 7/2008 | Onishi et al. |
| 2008/0203815 | A1 | 8/2008 | Ozawa et al. |
| 2008/0211320 | A1 | 9/2008 | Cook et al. |
| 2008/0242337 | A1 | 10/2008 | Sampath et al. |
| 2008/0252254 | A1 | 10/2008 | Osada |
| 2008/0258679 | A1 | 10/2008 | Manico et al. |
| 2008/0261519 | A1 | 10/2008 | DeMarco et al. |
| 2008/0266748 | A1 | 10/2008 | Lee |
| 2008/0278264 | A1 | 11/2008 | Karalis et al. |
| 2009/0015075 | A1 | 1/2009 | Cook et al. |
| 2009/0031069 | A1 | 1/2009 | Habuto et al. |
| 2009/0045772 | A1 | 2/2009 | Cook et al. |
| 2009/0058189 | A1 | 3/2009 | Cook et al. |
| 2009/0072629 | A1 | 3/2009 | Cook et al. |
| 2009/0072782 | A1 | 3/2009 | Randall |

(56) References Cited

U.S. PATENT DOCUMENTS

| | | |
|---|---|---|
| 2009/0075704 A1* | 3/2009 | Wang .................... 455/573 |
| 2009/0127937 A1 | 5/2009 | Widmer et al. |
| 2009/0134712 A1 | 5/2009 | Cook et al. |
| 2009/0174258 A1* | 7/2009 | Liu et al. .................... 307/64 |
| 2009/0212636 A1* | 8/2009 | Cook et al. ................ 307/104 |
| 2009/0224609 A1 | 9/2009 | Cook et al. |
| 2009/0243397 A1 | 10/2009 | Cook et al. |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286475 A1 | 11/2009 | Toncich et al. |
| 2009/0286476 A1 | 11/2009 | Toncich et al. |
| 2010/0023092 A1 | 1/2010 | Govari et al. |
| 2010/0033021 A1 | 2/2010 | Bennett |
| 2010/0038970 A1 | 2/2010 | Cook et al. |
| 2010/0039066 A1* | 2/2010 | Yuan et al. .................... 320/108 |
| 2010/0081378 A1 | 4/2010 | Kawamura |
| 2010/0109445 A1 | 5/2010 | Kurs et al. |
| 2010/0148939 A1 | 6/2010 | Yamada et al. |
| 2010/0181841 A1 | 7/2010 | Azancot et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201310 A1 | 8/2010 | Vorenkamp et al. |
| 2010/0201311 A1 | 8/2010 | Lyell Kirby et al. |
| 2010/0201312 A1 | 8/2010 | Kirby et al. |
| 2010/0213896 A1 | 8/2010 | Ishii et al. |
| 2010/0289341 A1 | 11/2010 | Ozaki et al. |
| 2010/0323642 A1 | 12/2010 | Morita |
| 2010/0328044 A1 | 12/2010 | Waffenschmidt et al. |
| 2011/0057606 A1 | 3/2011 | Saunamaki |
| 2011/0074347 A1 | 3/2011 | Karalis et al. |
| 2011/0133569 A1 | 6/2011 | Cheon et al. |
| 2011/0176251 A1 | 7/2011 | Lee |
| 2012/0007437 A1 | 1/2012 | Fells et al. |
| 2013/0147428 A1 | 6/2013 | Kirby et al. |
| 2013/0147429 A1 | 6/2013 | Kirby et al. |
| 2013/0300358 A1 | 11/2013 | Kirby et al. |
| 2014/0103881 A1 | 4/2014 | Mohammadian et al. |

FOREIGN PATENT DOCUMENTS

| | | |
|---|---|---|
| CN | 2681368 Y | 2/2005 |
| CN | 1604426 A | 4/2005 |
| CN | 1722521 A | 1/2006 |
| CN | 1768462 A | 5/2006 |
| CN | 1768467 A | 5/2006 |
| CN | 1808473 A | 7/2006 |
| CN | 1829037 A | 9/2006 |
| CN | 1881733 A | 12/2006 |
| CN | 1906863 A | 1/2007 |
| CN | 1912786 A | 2/2007 |
| CN | 1941541 A | 4/2007 |
| CN | 1965324 A | 5/2007 |
| CN | 1996352 A | 7/2007 |
| CN | 101123318 A | 2/2008 |
| CN | 101136561 A | 3/2008 |
| CN | 101154823 A | 4/2008 |
| CN | 201044047 Y | 4/2008 |
| CN | 101233666 A | 7/2008 |
| CN | 101291268 A | 10/2008 |
| DE | 4004196 | 4/1991 |
| DE | 29710675 U1 | 8/1997 |
| DE | 10104019 | 1/2002 |
| EP | 0444416 A1 | 9/1991 |
| EP | 0689149 | 12/1995 |
| EP | 0831411 | 3/1998 |
| EP | 0962407 A1 | 12/1999 |
| EP | 0977304 A1 | 2/2000 |
| EP | 1022677 A1 | 7/2000 |
| EP | 1050839 | 11/2000 |
| EP | 1298578 A1 | 4/2003 |
| EP | 1454769 A1 | 9/2004 |
| EP | 1502543 A1 | 2/2005 |
| EP | 1538726 A1 | 6/2005 |
| EP | 1585268 A2 | 10/2005 |
| EP | 1703435 | 9/2006 |
| EP | 1713145 | 10/2006 |
| EP | 1919091 | 5/2008 |
| EP | 2093860 A1 | 8/2009 |
| GB | 2307379 | 5/1997 |
| GB | 2380359 | 4/2003 |
| GB | 2395627 | 5/2004 |
| GB | 2416633 | 2/2006 |
| GB | 2433178 | 6/2007 |
| JP | 59031054 U | 2/1984 |
| JP | 6112720 A | 4/1994 |
| JP | H0739077 A | 2/1995 |
| JP | H07131376 A | 5/1995 |
| JP | 9103037 A | 4/1997 |
| JP | 9147070 A | 6/1997 |
| JP | 10145987 A | 5/1998 |
| JP | H10210751 A | 8/1998 |
| JP | 10240880 A | 9/1998 |
| JP | 10295043 A | 11/1998 |
| JP | H10293826 A | 11/1998 |
| JP | 11025238 A | 1/1999 |
| JP | 11069640 | 3/1999 |
| JP | 11098706 | 4/1999 |
| JP | 11122832 | 4/1999 |
| JP | H11134566 A | 5/1999 |
| JP | H11155245 A | 6/1999 |
| JP | 11188113 | 7/1999 |
| JP | 2000050534 A | 2/2000 |
| JP | 2000057450 A | 2/2000 |
| JP | 2000501263 A | 2/2000 |
| JP | 2000067195 A | 3/2000 |
| JP | 2000113127 A | 4/2000 |
| JP | 2000172795 A | 6/2000 |
| JP | 2001238372 A | 8/2001 |
| JP | 2001511574 A | 8/2001 |
| JP | 2001291080 A | 10/2001 |
| JP | 2001309579 A | 11/2001 |
| JP | 2002034169 A | 1/2002 |
| JP | 2002050534 A | 2/2002 |
| JP | 2002513490 A | 5/2002 |
| JP | 2002529982 A | 9/2002 |
| JP | 2003011734 A | 1/2003 |
| JP | 2003047178 A | 2/2003 |
| JP | 2003224937 A | 8/2003 |
| JP | 2004007851 A | 1/2004 |
| JP | 2004096589 A | 3/2004 |
| JP | 2004135455 A | 4/2004 |
| JP | 2004159456 A | 6/2004 |
| JP | 2004526236 A | 8/2004 |
| JP | 2004274972 A | 9/2004 |
| JP | 2004297779 A | 10/2004 |
| JP | 2004306558 A | 11/2004 |
| JP | 2004355212 A | 12/2004 |
| JP | 2005110412 A | 4/2005 |
| JP | 2005135455 A | 5/2005 |
| JP | 2005159607 A | 6/2005 |
| JP | 2005204493 A | 7/2005 |
| JP | 2005520428 A | 7/2005 |
| JP | 2005208754 A | 8/2005 |
| JP | 2005224045 A | 8/2005 |
| JP | 2005261187 A | 9/2005 |
| JP | 2005267643 A | 9/2005 |
| JP | 2005303697 A | 10/2005 |
| JP | 2006060909 A | 3/2006 |
| JP | 2006510101 A | 3/2006 |
| JP | 2006141170 A | 6/2006 |
| JP | 2006149168 A | 6/2006 |
| JP | 2006174676 A | 6/2006 |
| JP | 2006517378 A | 7/2006 |
| JP | 2006254678 A | 9/2006 |
| JP | 2006295905 A | 10/2006 |
| JP | 2006296123 A | 10/2006 |
| JP | 2006314181 A | 11/2006 |
| JP | 2007006029 A | 1/2007 |
| JP | 2007043773 A | 2/2007 |

(56) References Cited

FOREIGN PATENT DOCUMENTS

| | | |
|---|---|---|
| JP | 2007104868 A | 4/2007 |
| JP | 2007166379 A | 6/2007 |
| JP | 3995724 B2 | 10/2007 |
| JP | 2007537688 A | 12/2007 |
| JP | 2008508842 A | 3/2008 |
| JP | 2008104295 A | 5/2008 |
| JP | 2008109646 A | 5/2008 |
| JP | 2008120357 A | 5/2008 |
| JP | 2008199857 A | 8/2008 |
| JP | 2008199882 A | 8/2008 |
| JP | 2008295191 A | 12/2008 |
| JP | 2009523402 A | 6/2009 |
| JP | 2009527147 A | 7/2009 |
| JP | 2010508007 A | 3/2010 |
| JP | 2010508008 A | 3/2010 |
| KR | 101998002439 | 7/1998 |
| KR | 20000011967 A | 2/2000 |
| KR | 20040072581 A | 8/2004 |
| KR | 20050105200 A | 11/2005 |
| KR | 20070017804 A | 2/2007 |
| KR | 20070032271 A | 3/2007 |
| KR | 20080036702 A | 4/2008 |
| TW | 546960 B | 8/2003 |
| TW | 200306048 A | 11/2003 |
| TW | 200512964 | 4/2005 |
| TW | 200614626 | 5/2006 |
| TW | M294779 U | 7/2006 |
| TW | 200717963 A | 5/2007 |
| TW | M317367 U | 8/2007 |
| TW | 200820537 A | 5/2008 |
| TW | 200824215 A | 6/2008 |
| TW | M334559 U | 6/2008 |
| TW | 200830663 A | 7/2008 |
| TW | M336621 U | 7/2008 |
| TW | 200843282 A | 11/2008 |
| TW | 200901597 A | 1/2009 |
| TW | M349639 U | 1/2009 |
| TW | I347724 | 8/2011 |
| TW | I366320 | 6/2012 |
| WO | WO-9829969 | 7/1998 |
| WO | WO-9854912 | 12/1998 |
| WO | WO-9905658 A1 | 2/1999 |
| WO | WO-0027137 A1 | 5/2000 |
| WO | WO02027682 | 4/2002 |
| WO | WO-02062077 A1 | 8/2002 |
| WO | WO-03044970 A2 | 5/2003 |
| WO | WO-03079524 A2 | 9/2003 |
| WO | 2004025805 A1 | 3/2004 |
| WO | WO-2004032349 | 4/2004 |
| WO | WO-2004055654 A2 | 7/2004 |
| WO | WO 2004068726 A2 | 8/2004 |
| WO | WO-2004073150 A1 | 8/2004 |
| WO | WO-2004073166 A2 | 8/2004 |
| WO | WO-2004096023 A1 | 11/2004 |
| WO | WO-2005104022 | 11/2005 |
| WO | 2006011769 A1 | 2/2006 |
| WO | WO-2006031133 A1 | 3/2006 |
| WO | WO 2006068416 A1 | 6/2006 |
| WO | WO2007000055 | 1/2007 |
| WO | WO-2007044144 | 4/2007 |
| WO | WO-2007081971 A2 | 7/2007 |
| WO | WO-2007084717 A2 | 7/2007 |
| WO | 2007095267 A2 | 8/2007 |
| WO | WO-2007138690 A1 | 12/2007 |
| WO | WO-2008011769 A1 | 1/2008 |
| WO | WO-2008050260 A1 | 5/2008 |
| WO | WO-2008050292 A2 | 5/2008 |
| WO | WO2008072628 A1 | 6/2008 |
| WO | WO2008109691 A2 | 9/2008 |
| WO | WO2009140221 | 11/2009 |
| WO | WO-2009140222 A1 | 11/2009 |
| WO | WO-2009140223 | 11/2009 |

OTHER PUBLICATIONS

Taiwan Search Report—TW099104284—TIPO—Apr. 25, 2013.

Nikitin P.V., et al., "Theory and Measurement of Backscattering from RFID Tags", Antennas and Propagation Magazine, Dec. 2006, p. 8. URL:http://www.ee.washington.edu/people/faculty/nikitin_pavel/papers/APmag_2006.pdf.

Turner C., et al., "Backscatter modulation of Impedance Modulated RFID tags", Feb. 2003, p. 5. URL:http://www.rfip.eu/downloads/backscatter_tag_link_budget_and_modulation_at_reader_receiver.pdf.

\* cited by examiner

CONVEYING DEVICE INFORMATION RELATING TO WIRELESS CHARGING

CLAIM OF PRIORITY UNDER 35 U.S.C. §119

This application claims priority under 35 U.S.C. §119(e) to:

U.S. Provisional Patent Application 61/152,363 entitled "KEEP TRACK OF OBJECTS FOR WIRELESS CHARGING" filed on Feb. 13, 2009, and assigned to the assignee hereof and hereby expressly incorporated by reference herein; and U.S. Provisional Patent Application 61/151,290, entitled "MULTI DIMENSIONAL WIRELESS CHARGER" filed on Feb. 10, 2009, and assigned to the assignee hereof and hereby expressly incorporated by reference herein.

BACKGROUND

1. Field

The present invention relates generally to wireless charging, and more specifically to devices, systems, and methods related to wireless chargers.

2. Background

In a wired charging system or device, an electronic device may be connected to a power source, via a cord and, therefore, a charging status of the electronic device may be quickly and easily established. With wireless charging, however, there is no cord and, therefore, a charging status of an electronic device may not be known. For example, it may not be evident that an electronic device is actually receiving power or how much power is stored within the electronic device. A need exists for devices, systems, and methods related to providing information related to an electronic device while the electronic device is within a charging region of a wireless charging device.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
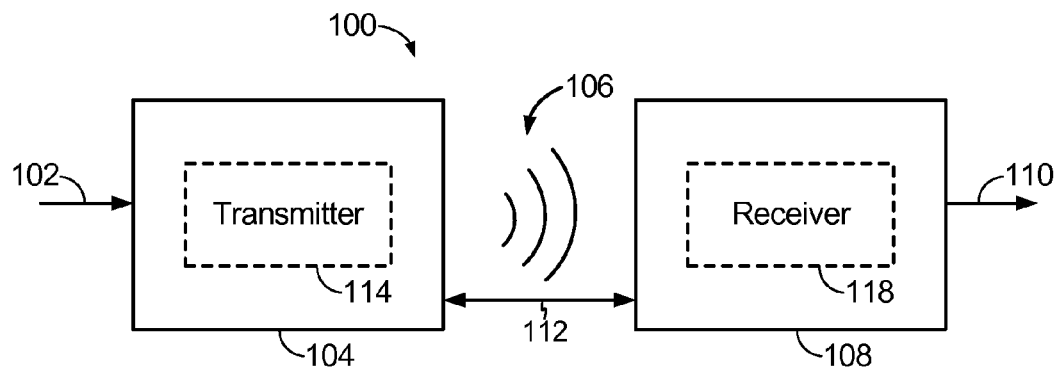
FIG. 1 shows a simplified block diagram of a wireless power transfer system.

FIG. 1 illustrates wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are exactly identical, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far-field. When in this near-field a coupling mode may be developed between the transmit antenna 114 and the receive antenna 118. The area around the antennas 114 and 118 where this near-field coupling may occur is referred to herein as a coupling-mode region.

Figure 2:
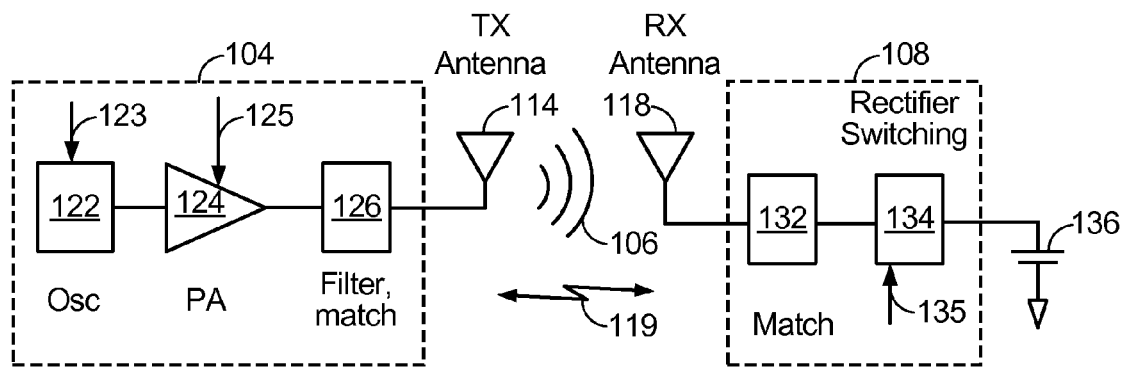
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver may include a matching circuit 132 and a rectifier and switching circuit to generate a DC power output to charge a battery 136 as shown in FIG. 2 or power a device coupled to the receiver (not shown). The matching circuit 132 may be included to match the impedance of the receiver 108 to the receive antenna 118.

Figure 3:
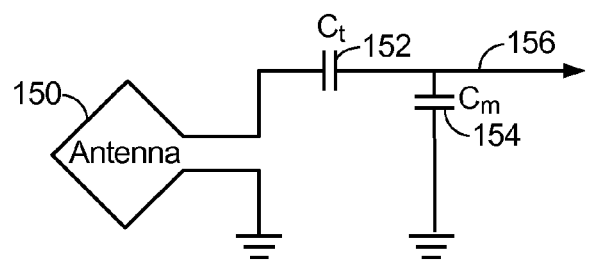
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far-field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4A:
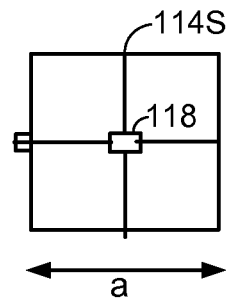
FIGS. 4A and 4B show layouts of loop antennas for transmit and receive antennas according to exemplary embodiments of the present invention.
Figure 4B:
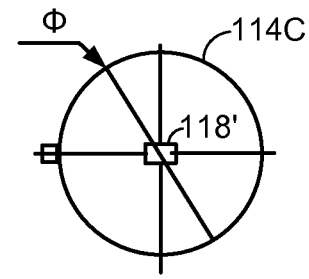

FIGS. 4A and 4B show layouts of loop antennas for transmit and receive antennas according to exemplary embodiments of the present invention. Loop antennas may be configured in a number of different ways, with single loops or multiple loops at wide variety of sizes. In addition, the loops may be a number of different shapes, such as, for example only, circular, elliptical, square, and rectangular. FIG. 4A illustrates a large square loop transmit antenna 114S and a small square loop receive antenna 118 placed in the same plane as the transmit antenna 114S and near the center of the transmit antenna 114S. FIG. 4B illustrates a large circular loop transmit antenna 114C and a small square loop receive antenna 118' placed in the same plane as the transmit antenna 114C and near the center of the transmit antenna 114C. The square loop transmit antenna 114S has side lengths of "a" while the circular loop transmit antenna 114C has a diameter of "Φ." For a square loop, it can be shown that there is an equivalent circular loop whose diameter may be defined as: $\Phi_{eq} = 4a/\pi$.

Figure 5:
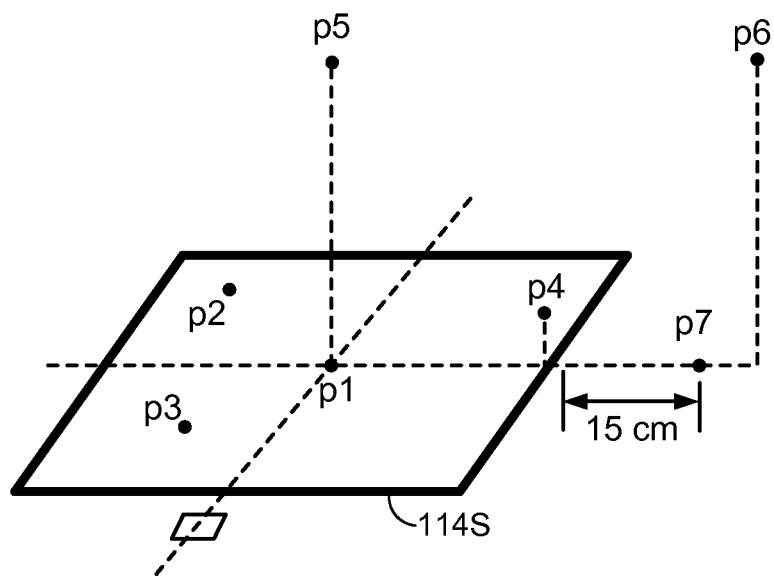
FIG. 5 shows various placement points for a receive antenna relative to a transmit antenna to illustrate coupling strengths in coplanar and coaxial placements.

FIG. 5 shows various placement points for a receive antenna relative to a transmit antenna to illustrate coupling strengths in coplanar and coaxial placements. "Coplanar," as used herein, means that the transmit antenna and receive antenna have planes that are substantially aligned (i.e., have surface normals pointing in substantially the same direction) and with no distance (or a small distance) between the planes of the transmit antenna and the receive antenna. "Coaxial," as used herein, means that the transmit antenna and receive antenna have planes that are substantially aligned (i.e., have surface normals pointing in substantially the same direction) and the distance between the two planes is not trivial and furthermore, the surface normal of the transmit antenna and the receive antenna lie substantially along the same vector, or the two normals are in echelon.

As examples, points p1, p2, p3, and p7 are all coplanar placement points for a receive antenna relative to a transmit antenna. As another example, point p5 and p6 are coaxial placement points for a receive antenna relative to a transmit antenna. The table below shows coupling strength (S21) and coupling efficiency (expressed as a percentage of power transmitted from the transmit antenna that reached the receive antenna) at the various placement points (p1-p7) illustrated in FIG. 5.

TABLE 1

| Position | Distance from plane (cm) | S21 efficiency (%) | Efficiency (TX DC power in to RX DC power out) |
| --- | --- | --- | --- |
| p1 | 0 | 46.8 | 28 |
| p2 | 0 | 55.0 | 36 |
| p3 | 0 | 57.5 | 35 |
| p4 | 2.5 | 49.0 | 30 |
| p5 | 17.5 | 24.5 | 15 |
| p6 | 17.5 | 0.3 | 0.2 |
| p7 | 0 | 5.9 | 3.4 |

As can be seen, the coplanar placement points p1, p2, and p3, all show relatively high coupling efficiencies. Placement point p7 is also a coplanar placement point, but is outside of the transmit loop antenna. While placement point p7 does not have a high coupling efficiency, it is clear that there is some coupling and the coupling-mode region extends beyond the perimeter of the transmit loop antenna.

Placement point p5 is coaxial with the transmit antenna and shows substantial coupling efficiency. The coupling efficiency for placement point p5 is not as high as the coupling efficiencies for the coplanar placement points. However, the coupling efficiency for placement point p5 is high enough that substantial power can be conveyed between the transmit antenna and a receive antenna in a coaxial placement.

Placement point p4 is within the circumference of the transmit antenna but at a slight distance above the plane of the transmit antenna in a position that may be referred to as an offset coaxial placement (i.e., with surface normals in substantially the same direction but at different locations) or offset coplanar (i.e., with surface normals in substantially the same direction but with planes that are offset relative to each other). From the table it can be seen that with an offset distance of 2.5 cm, placement point p4 still has relatively good coupling efficiency.

Placement point p6 illustrates a placement point outside the circumference of the transmit antenna and at a substantial distance above the plane of the transmit antenna. As can be seen from the table, placement point p7 shows little coupling efficiency between the transmit and receive antennas.

Figure 6:
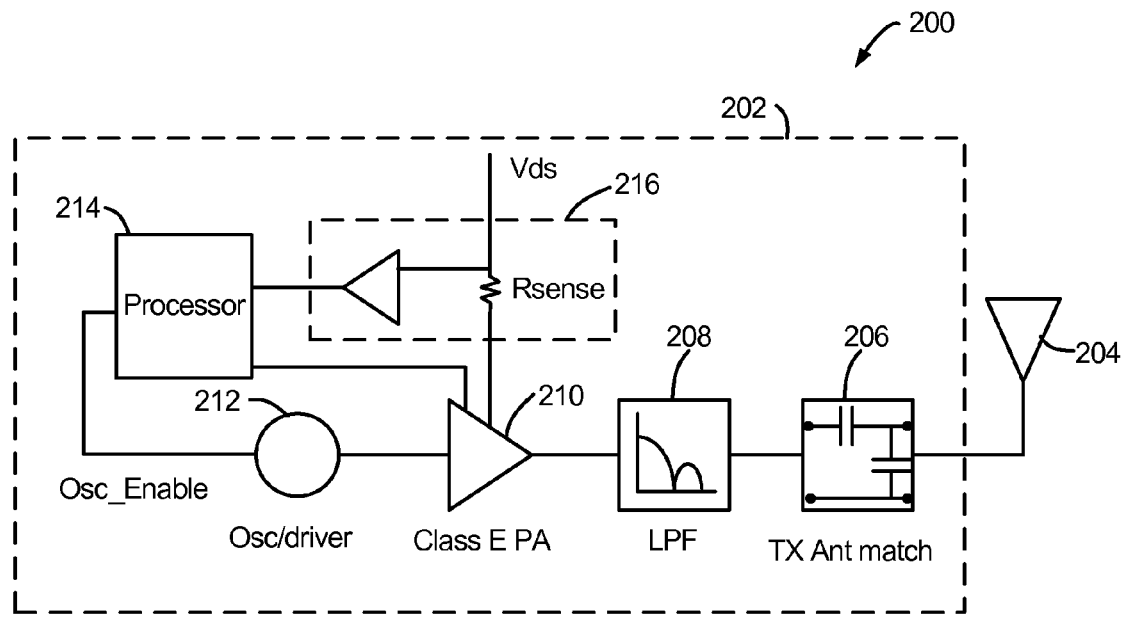
FIG. 6 is a simplified block diagram of a transmitter, in accordance with an exemplary embodiment of the present invention.

FIG. 6 is a simplified block diagram of a transmitter, in accordance with an exemplary embodiment of the present invention. A transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a processor 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by processor 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

Figure 7:
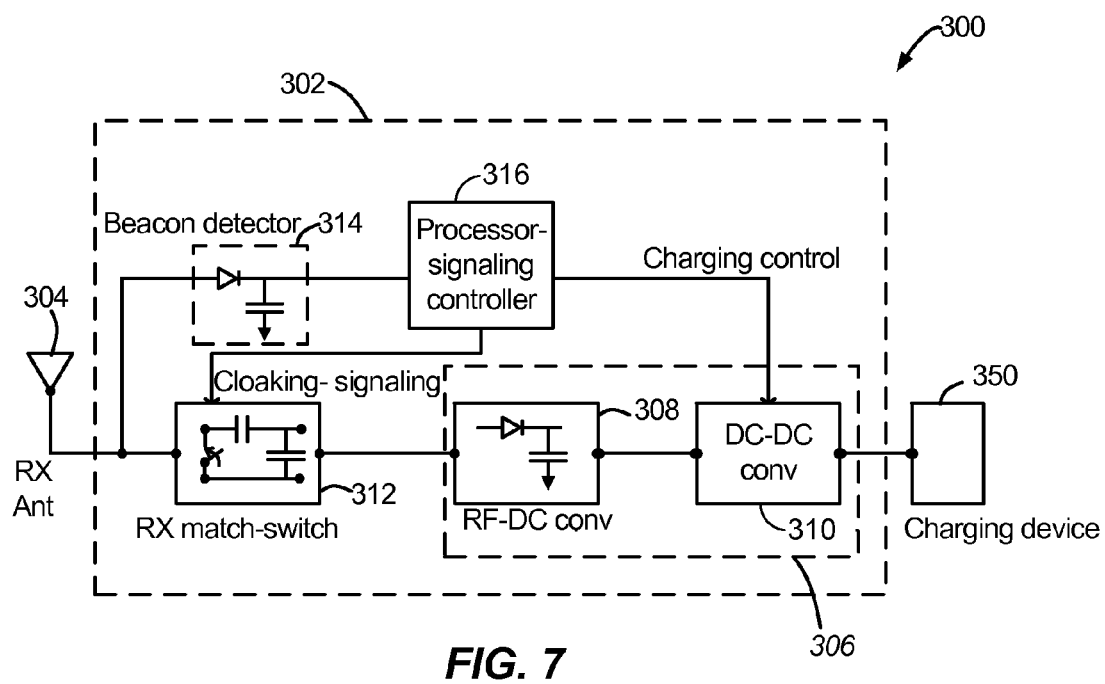
FIG. 7 is a simplified block diagram of a receiver, in accordance with an exemplary embodiment of the present invention.

FIG. 7 is a block diagram of a receiver, in accordance with an exemplary embodiment of the present invention. A receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 6). Receive antenna 304 may be similarly dimensioned with transmit antenna 204 or may be differently sized based upon the dimensions of an associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2) as is explained more fully below. As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 8:
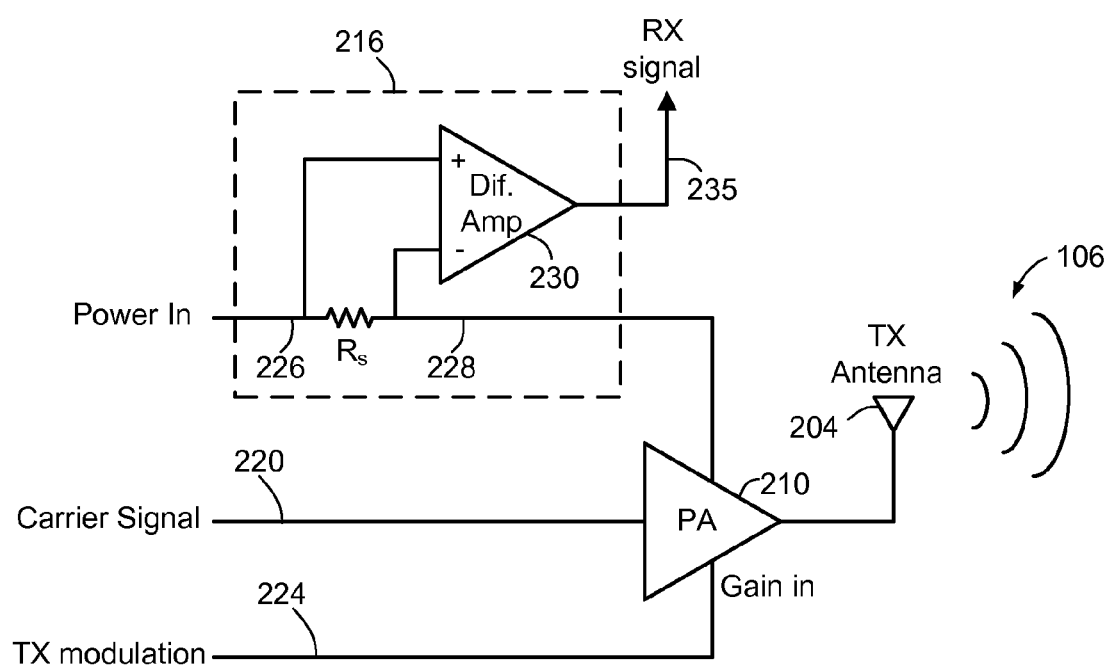
FIG. 8 shows a simplified schematic of a portion of transmit circuitry for carrying out messaging between a transmitter and a receiver.

FIG. 8 shows a simplified schematic of a portion of transmit circuitry for carrying out messaging between a transmitter and a receiver. In some exemplary embodiments of the present invention, a means for communication may be enabled between the transmitter and the receiver. In FIG. 8 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 8 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 8) the amount of current drawn by the power amplifier 210 will change. In other words, if no coupled mode resonance exist for the transmit antenna 210, the power required to drive the radiated field will be first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna, as explained below. Additionally, a change in receiver current draw will be observable in the transmitter's power amplifier current draw, and this change can be used to detect signals from the receive antennas, as explained below.

Figure 9A:
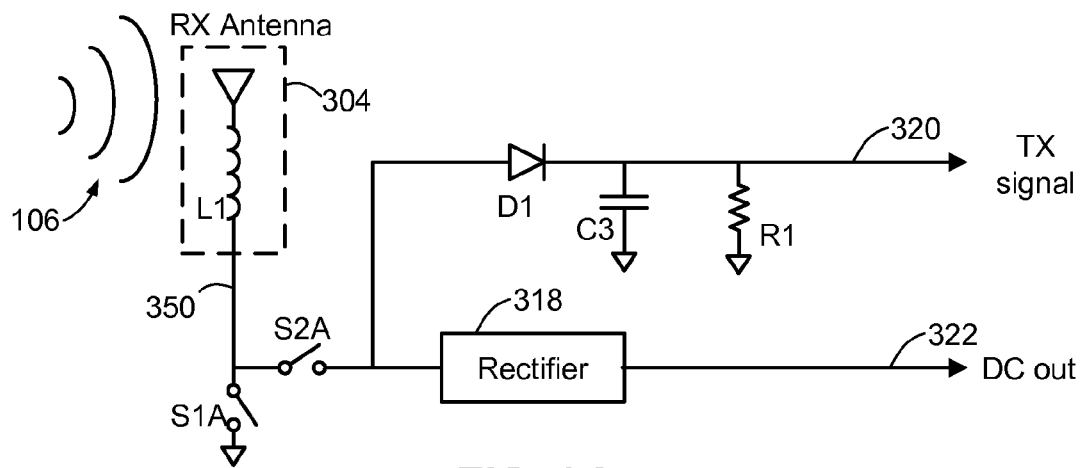
FIGS. 9A-9C shows a simplified schematic of a portion of receive circuitry in various states to illustrate messaging between a receiver and a transmitter.
Figure 9B:
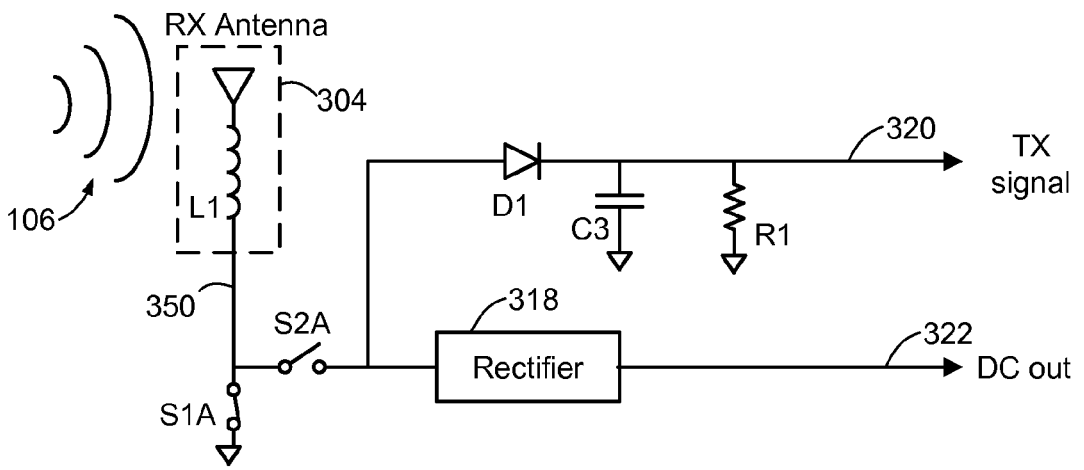
Figure 9C:
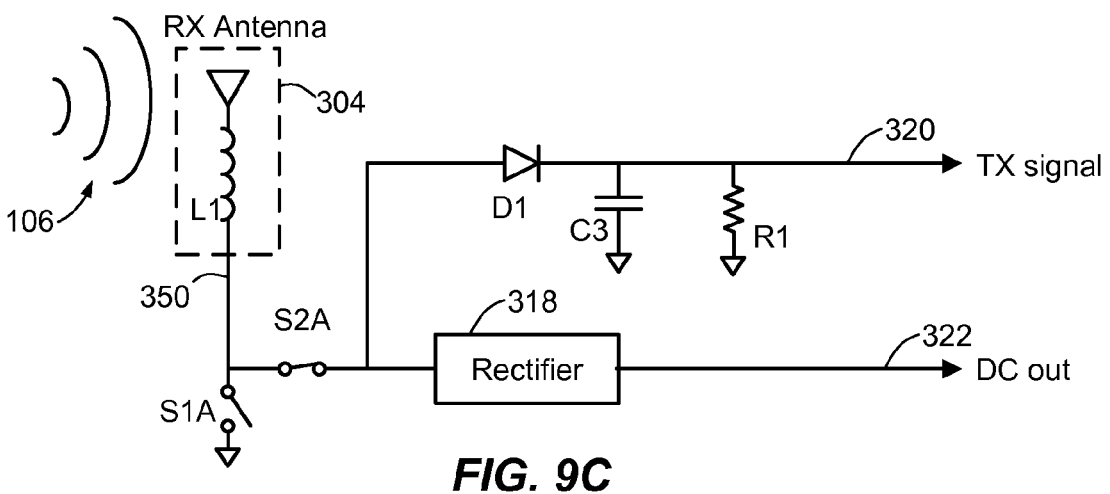

FIGS. 9A-9C show a simplified schematic of a portion of receive circuitry in various states to illustrate messaging between a receiver and a transmitter. All of FIGS. 9A-9C show the same circuit elements with the difference being state of the various switches. A receive antenna 304 includes a characteristic inductance L1, which drives node 350. Node 350 is selectively coupled to ground through switch S1A. Node 350 is also selectively coupled to diode D1 and rectifier

318 through switch S1B. The rectifier 318 supplies a DC power signal 322 to a receive device (not shown) to power the receive device, charge a battery, or a combination thereof. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 8.

Exemplary embodiments of the invention includes modulation of the receive device's current draw and modulation of the receive antenna's impedance to accomplish reverse link signaling. With reference to both FIG. 9A and FIG. 8, as the power draw of the receive device changes, the load sensing circuit 216 detects the resulting power changes on the transmit antenna and from these changes can generate the receive signal 235.

In the exemplary embodiments of FIGS. 9A-9C, the current draw through the transmitter can be changed by modifying the state of switches S1A and S2A. In FIG. 9A, switch S1A and switch S2A are both open creating a "DC open state" and essentially removing the load from the transmit antenna 204. This reduces the current seen by the transmitter.

In FIG. 9B, switch S1A is closed and switch S2A is open creating a "DC short state" for the receive antenna 304. Thus the state in FIG. 9B can be used to increase the current seen in the transmitter.

In FIG. 9C, switch S1A is open and switch S2A is closed creating a normal receive mode (also referred to herein as a "DC operating state") wherein power can be supplied by the DC out signal 322 and a transmit signal 320 can be detected. In the state shown in FIG. 9C the receiver receives a normal amount of power, thus consuming more or less power from the transmit antenna than the DC open state or the DC short state.

Reverse link signaling may be accomplished by switching between the DC operating state (FIG. 9C) and the DC short state (FIG. 9B). Reverse link signaling also may be accomplished by switching between the DC operating state (FIG. 9C) and the DC open state (FIG. 9A).

Figure 10A:
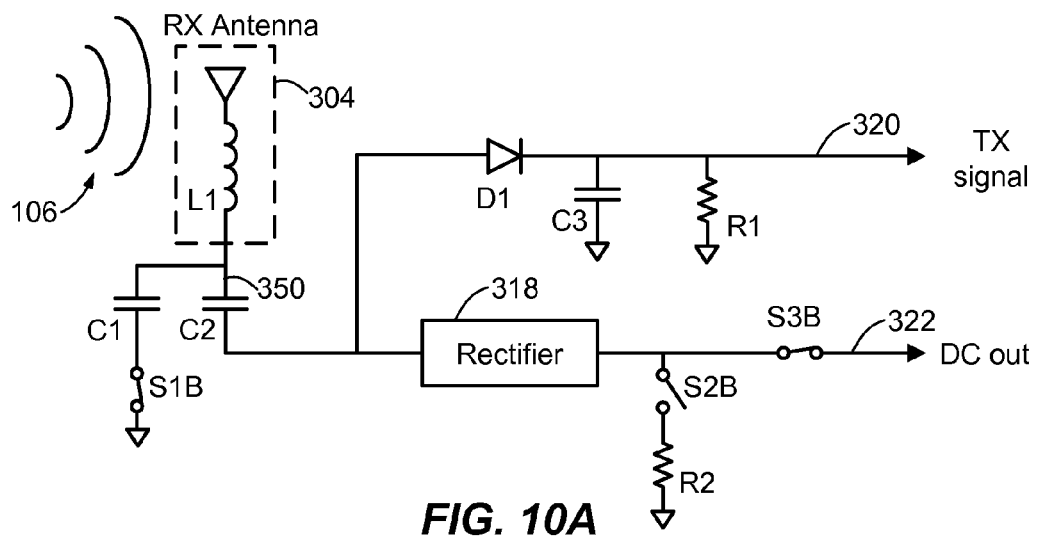
FIGS. 10A-10C shows a simplified schematic of a portion of alternative receive circuitry in various states to illustrate messaging between a receiver and a transmitter.
Figure 10B:
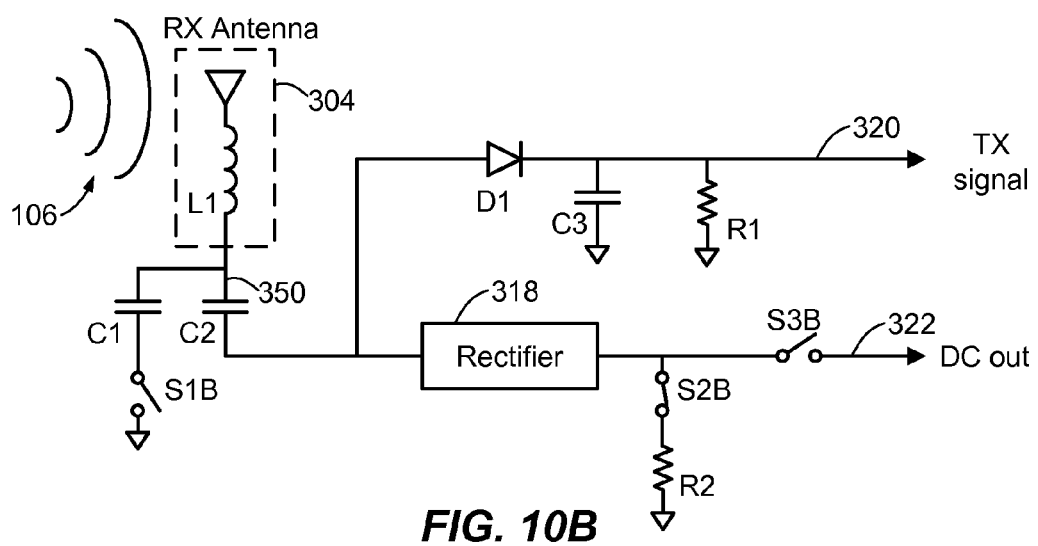
Figure 10C:
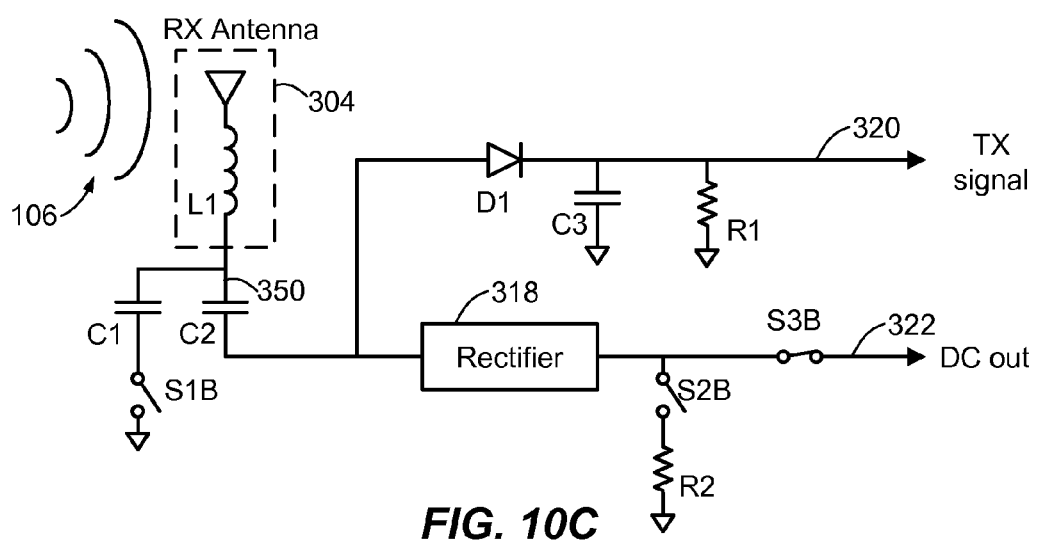

FIGS. 10A-10C shows a simplified schematic of a portion of alternative receive circuitry in various states to illustrate messaging between a receiver and a transmitter. All of FIGS. 10A-10C show the same circuit elements with the difference being state of the various switches. A receive antenna 304 includes a characteristic inductance L1, which drives node 350. Node 350 is selectively coupled to ground through capacitor C1 and switch S1B. Node 350 is also AC coupled to diode D1 and rectifier 318 through capacitor C2. The diode D1 is coupled to a transmit signal 320 which is filtered to remove harmonics and unwanted frequencies with capacitor C3 and resistor R1. Thus the combination of D1, C3, and R1 can generate a signal on the transmit signal 320 that mimics the transmit modulation generated by the transmit modulation signal 224 discussed above with reference to the transmitter in FIG. 8.

The rectifier 318 is connected to switch S2B, which is connected in series with resistor R2 and ground. The rectifier 318 also is connected to switch S3B. The other side of switch S3B supplies a DC power signal 322 to a receive device (not shown) to power the receive device, charge a battery, or a combination thereof.

In FIGS. 9A-9C the DC impedance of the receive antenna 304 is changed by selectively coupling the receive antenna to ground through switch SIB. In contrast, in the exemplary embodiments of FIGS. 10A-10C, the impedance of the antenna can be modified to generate the reverse link signaling by modifying the state of switches S1B, S2B, and S3B to change the AC impedance of the receive antenna 304. In FIGS. 10A-10C the resonant frequency of the receive antenna 304 may be tuned with capacitor C2. Thus, the AC impedance of the receive antenna 304 may be changed by selectively coupling the receive antenna 304 through capacitor C1 using switch S1B, essentially changing the resonance circuit to a different frequency that will be outside of a range that will optimally couple with the transmit antenna. If the resonance frequency of the receive antenna 304 is near the resonant frequency of the transmit antenna, and the receive antenna 304 is in the near-field of the transmit antenna, a coupling mode may develop wherein the receiver can draw significant power from the radiated field 106.

In FIG. 10A, switch S1B is closed, which de-tunes the antenna and creates an "AC cloaking state," essentially "cloaking" the receive antenna 304 from detection by the transmit antenna 204 because the receive antenna does not resonate at the transmit antenna's frequency. Since the receive antenna will not be in a coupled mode, the state of switches S2B and S3B are not particularly important to the present discussion.

In FIG. 10B, switch S1B is open, switch S2B is closed, and switch S3B is open, creating a "tuned dummy-load state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S3B open and switch S2B closed creates a relatively high current dummy load for the rectifier, which will draw more power through the receive antenna 304, which can be sensed by the transmit antenna. In addition, the transmit signal 320 can be detected since the receive antenna is in a state to receive power from the transmit antenna.

In FIG. 10C, switch S1B is open, switch S2B is open, and switch S3B is closed, creating a "tuned operating state" for the receive antenna 304. Because switch S1B is open, capacitor C1 does not contribute to the resonance circuit and the receive antenna 304 in combination with capacitor C2 will be in a resonance frequency that may match with the resonant frequency of the transmit antenna. The combination of switch S2B open and switch S3B closed creates a normal operating state wherein power can be supplied by the DC out signal 322 and a transmit signal 320 can be detected.

Reverse link signaling may be accomplished by switching between the tuned operating state (FIG. 10C) and the AC cloaking state (FIG. 10A). Reverse link signaling also may be accomplished by switching between the tuned dummy-load state (FIG. 10B) and the AC cloaking state (FIG. 10A). Reverse link signaling also may be accomplished by switching between the tuned operating state (FIG. 10C) and the tuned dummy-load state (FIG. 10B) because there will be a difference in the amount of power consumed by the receiver, which can be detected by the load sensing circuit in the transmitter.

Of course, those of ordinary skill in the art will recognize that other combinations of switches S1B, S2B, and S3B may be used to create cloaking, generate reverse link signaling and supplying power to the receive device. In addition, the switches S1A and S1B may be added to the circuits of FIGS. 10A-10C to create other possible combinations for cloaking, reverse link signaling, and supplying power to the receive device.

Thus, when in a coupled mode signals may be sent from the transmitter to the receiver, as discussed above with reference to FIG. 8. In addition, when in a coupled mode signals may be sent from the receiver to the transmitter, as discussed above with reference to FIGS. 9A-9C and 10A-10C.

Figure 11A:
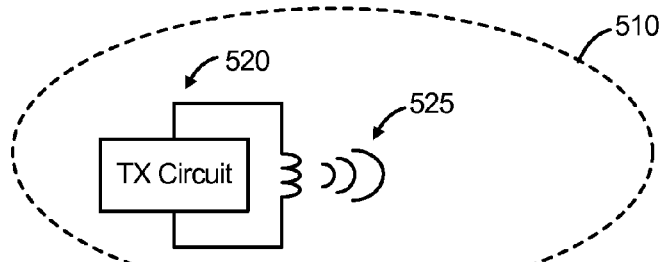
FIGS. 11A-11D are simplified block diagrams illustrating a beacon power mode for transmitting power between a transmitter and a receiver.

FIGS. 11A-11D are simplified block diagrams illustrating a beacon power mode for transmitting power between a transmitter and a one or more receivers. FIG. 11A illustrates a transmitter 520 having a low power "beacon" signal 525 when there are no receive devices in the beacon coupling-mode region 510. The beacon signal 525 may be, as a non-limiting example, such as in the range of ~10 to ~20 mW RF. This signal may be adequate to provide initial power to a device to be charged when it is placed in the coupling-mode region.

Figure 11B:
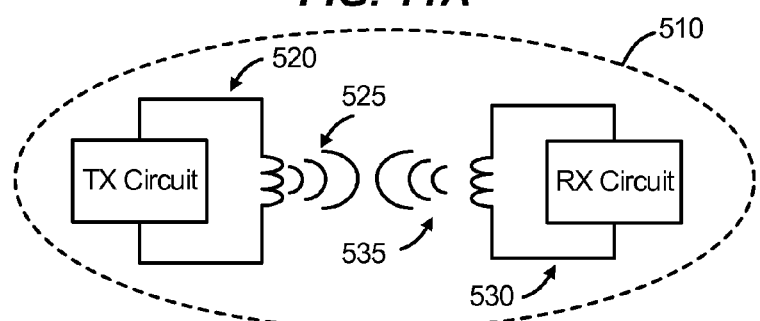

FIG. 11B illustrates a receive device 530 placed within the beacon coupling-mode region 510 of the transmitter 520 transmitting the beacon signal 525. If the receive device 530 is on and develops a coupling with the transmitter it will generate a reverse link coupling 535, which is really just the receiver accepting power from the beacon signal 525. This additional power, may be sensed by the load sensing circuit 216 (FIG. 8) of the transmitter. As a result, the transmitter may go into a high power mode.

Figure 11C:
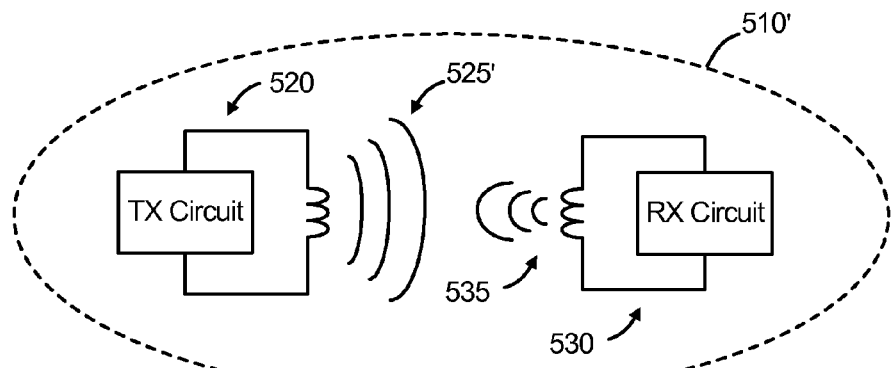

FIG. 11C illustrates the transmitter 520 generating a high power signal 525' resulting in a high power coupling-mode region 510'. As long as the receive device 530 is accepting power and, as a result, generating the reverse link coupling 535, the transmitter will remain in the high power state. While only one receive device 530 is illustrated, multiple receive devices 530 may be present in the coupling-mode region 510. If there are multiple receive device 530 they will share the amount of power transmitted by the transmitter based on how well each receive device 530 is coupled. For example, the coupling efficiency may be different for each receive device 530 depending on where the device is placed within the coupling-mode region 510 as was explained above with reference to FIGS. 8 and 9.

Figure 11D:
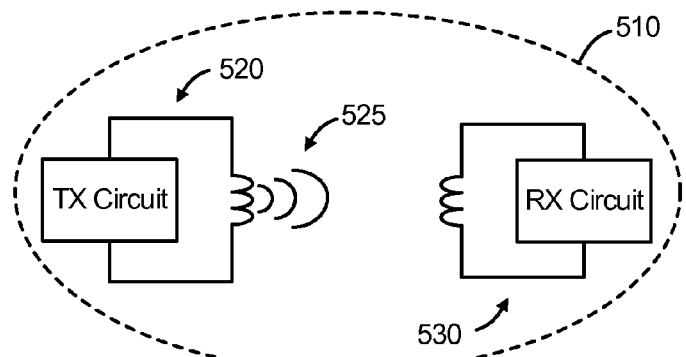

FIG. 11D illustrates the transmitter 520 generating the beacon signal 525 even when a receive device 530 is in the beacon coupling-mode region 510. This state may occur when the receive device 530 is shut off, or the device cloaks itself, perhaps because it does not need any more power.

The receiver and transmitter may communicate on a separate communication channel (e.g., Bluetooth, zigbee, etc). With a separate communication channel, the transmitter may determine when to switch between beacon mode and high power mode, or create multiple power levels, based on the number of receive devices in the coupling-mode region 510 and their respective power requirements.

Exemplary embodiments of the invention include enhancing the coupling between a relatively large transmit antenna and a small receive antenna in the near-field power transfer between two antennas through introduction of additional antennas into the system of coupled antennas that will act as repeaters and will enhance the flow of power from the transmitting antenna toward the receiving antenna.

In exemplary embodiments, one or more extra antennas are used that couple to the transmit antenna and receive antenna in the system. These extra antennas comprise repeater antennas, such as active or passive antennas. A passive antenna may include simply the antenna loop and a capacitive element for tuning a resonant frequency of the antenna. An active element may include, in addition to the antenna loop and one or more tuning capacitors, an amplifier for increasing the strength of a repeated near-field radiation.

The combination of the transmit antenna and the repeater antennas in the power transfer system may be optimized such that coupling of power to very small receive antennas is enhanced based on factors such as termination loads, tuning components, resonant frequencies, and placement of the repeater antennas relative to the transmit antenna.

A single transmit antenna exhibits a finite near-field coupling mode region. Accordingly, a user of a device charging through a receiver in the transmit antenna's near-field coupling mode region may require a considerable user access space that would be prohibitive or at least inconvenient. Furthermore, the coupling mode region may diminish quickly as a receive antenna moves away from the transmit antenna.

A repeater antenna may refocus and reshape a coupling mode region from a transmit antenna to create a second coupling mode region around the repeater antenna, which may be better suited for coupling energy to a receive antenna. Discussed below in FIGS. 11A-12B are exemplary embodiments including repeater antennas.

Figure 12A:
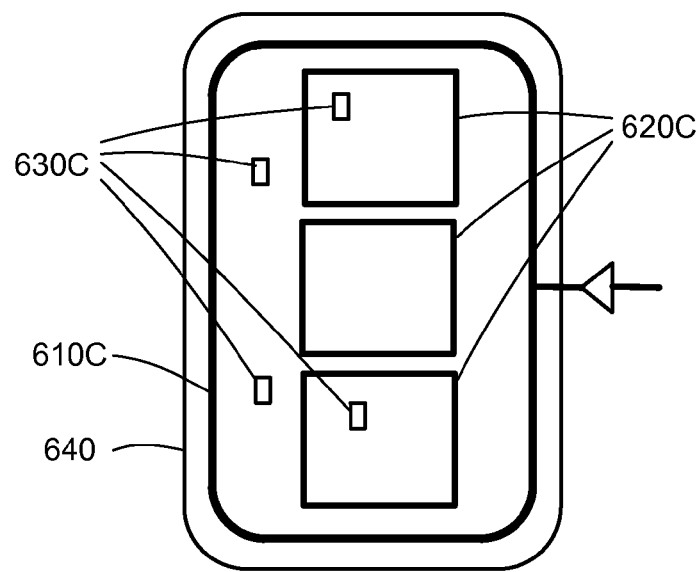
FIG. 12A illustrates a large transmit antenna with a three different smaller repeater antennas disposed coplanar with, and within a perimeter of, the transmit antenna.

FIG. 12A illustrates a large transmit antenna 610C with three smaller repeater antennas 620C disposed coplanar with, and within a perimeter of, the transmit antenna 610C. The transmit antenna 610C and repeater antennas 620C are formed on a table 640. Various devices including receive antennas 630C are placed at various locations within the transmit antenna 610C and repeater antennas 620C. The exemplary embodiment of FIG. 12A may be able to refocus the coupling mode region generated by the transmit antenna 610C into smaller and stronger repeated coupling mode regions around each of the repeater antennas 620C. As a result, a relatively strong repeated near-field radiation is available for the receive antennas 630C. Some of the receive antennas are placed outside of any repeater antennas 620C. Recall that the coupled mode region may extend somewhat outside the perimeter of an antenna. Therefore, receive antennas 630C may be able to receive power from the near-field radiation of the transmit antenna 610C as well as any nearby repeater antennas 620C. As a result, receive antennas placed outside of any repeater antennas 620C, may be still be able to receive power from the near-field radiation of the transmit antenna 610C as well as any nearby repeater antennas 620C.

Figure 12B:
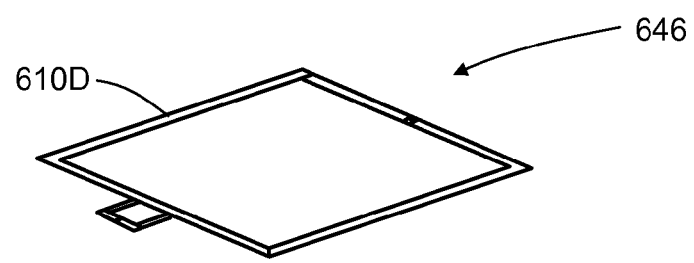
FIG. 12B illustrates a large transmit antenna with smaller repeater antennas with offset coaxial placements and offset coplanar placements relative to the transmit antenna.
Figure 12B:
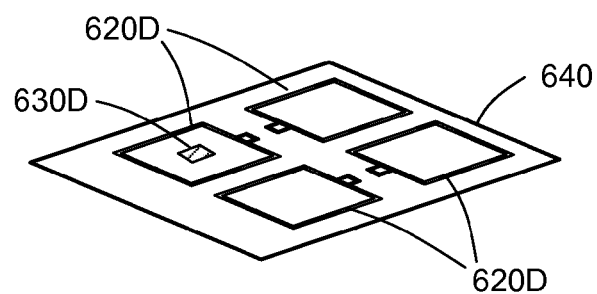

FIG. 12B illustrates a large transmit antenna 610D with smaller repeater antennas 620D with offset coaxial placements and offset coplanar placements relative to the transmit antenna 610D. A device including a receive antenna 630D is placed within the perimeter of one of the repeater antennas 620D. As a non-limiting example, the transmit antenna 610D may be disposed on a ceiling 646, while the repeater antennas 620D may be disposed on a table 640. The repeater antennas 620D in an offset coaxial placement may be able to reshape and enhance the near-field radiation from the transmitter antenna 610D to repeated near-field radiation around the repeater antennas 620D. As a result, a relatively strong repeated near-field radiation is available for the receive antenna 630D placed coplanar with the repeater antennas 620D.

While the various transmit antennas and repeater antennas have been shown in general on surfaces, these antennas may also be disposed under surfaces (e.g., under a table, under a floor, behind a wall, or behind a ceiling), or within surfaces (e.g., a table top, a wall, a floor, or a ceiling).

Various exemplary embodiments as described herein are directed to various charging devices and systems configured to convey information related to one or more electronic devices positioned within one or more charging regions of a wireless charging device. It is noted that the information relating to an electronic device may be acquired by an associated charging device through any known and suitable wireless signaling method. For example only, information relating to an electronic device may be acquired by an associated charging device through feedback sent from the electronic device or by sensing a load on the electronic device. An example of a wireless signaling method is described in U.S. patent application Ser. No. 12/249,873, entitled "REVERSE LINK SIGNALING VIA RECEIVE ANTENNA IMPEDANCE MODULATION" filed on Oct. 10, 2008, the details of which are incorporated by reference herein.

Figure 13:
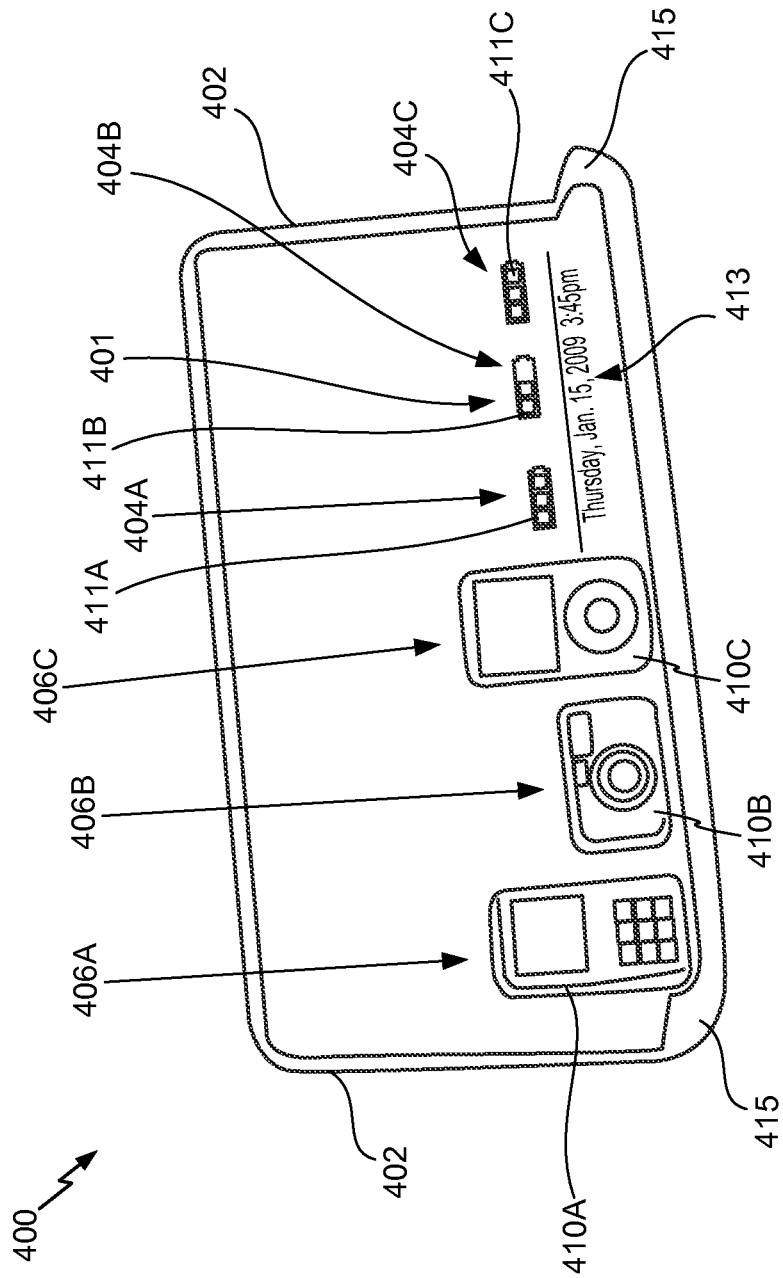
FIG. 13 illustrates a charging device including an interface having at least one indicator display, according to an exemplary embodiment of the present invention.

FIG. 13 depicts a wireless charging system 400 including a wireless charging device 402 having an interface 401 and one or more electronic devices 410, in accordance with an exemplary embodiment of the present invention. Charging device 402 may be configured to wirelessly charge at least one electronic device positioned thereon or proximate thereto. More specifically, charging device 402 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a battery (e.g., battery 136 depicted in FIG. 2) of an electronic device (e.g., electronic device 410A, electronic device 410B, or electronic device 410C). Upon receipt of the wirelessly transmitted power at the receive antenna and the associated receiver, power may be supplied to the battery of the electronic device. Wireless charging of an electronic device has been discussed in detail above and, therefore, will not be described any further.

As illustrated in FIG. 13, charging device 402 includes interface 401 including a plurality of indicator displays 404 (i.e., indicator display 404A, indicator display 404B, and indicator display 404C), wherein each indicator display 404 may be configured for conveying graphics, alphanumeric text, or any combination thereof. Specifically, each indicator display 404 may be configured to convey information relating to an electronic device positioned within an associated charging region 406 (i.e., charging regions 406A, 406B, and 406C) of charging device 402.

For example, indicator display 404A may be configured to display information relating to an electronic device 410A positioned within associated charging region 406A, indicator display 404B may be configured to display information relating to an electronic device 410B positioned within associated charging region 406B, and indicator display 404C may be configured to display information relating to an electronic device 410C positioned within associated charging region 406C.

Furthermore, each indicator display 404 may be configured to display an alphanumeric identifier of an electronic device positioned within an associated charging region. For example, each indicator display 404 may be configured to display a device label (e.g., a user name), a device type (e.g., cell phone, camera, etc.), or any combination thereof. As an example, indicator display 404A, which is associated with charging region 406A, may be configured to display alphanumeric text (e.g., "Jenn's cell phone") identifying electronic device 410A positioned within charging region 406A.

Further, each indicator display 404 may be configured to display information relating to a charging status of an electronic device positioned within a corresponding charging region. For example, according to one exemplary embodiment, each indicator display 404 may be configured to display one or more flashing lights within an associated progress indicator 411 (i.e., progress indicator 411A, progress indicator 411B, and progress indicator 411C) to indicate whether an electronic device positioned within an associated charging region is being charged. Furthermore, each progress indicator 411 may be configured to indicate an amount of charge existing within an associated electronic device at a moment in time. For example, indicator display 404B may be configured to display two lights within progress indicator 411B indicating that electronic device 410B positioned within associated charging region 406B is charging and has "two bars" worth of charge. As will be understood by one of ordinary skill in the art, a progress indicator displaying three bars (i.e., three lights) indicates more charge than a progress indicator displaying two bars (i.e., two lights), which indicates more charge than a progress indicator displaying one bar (i.e., one light). In addition, in accordance with an exemplary embodiment, each indicator display 404 may be configured to display information to indicate that an electronic device positioned within an associated charging region is fully charged. For example, indicator display 404C may be configured to display three continuous lights within progress indicator 411C indicating that electronic device 410C positioned within associated charging region 406C is fully charged. Moreover, each indicator display 404 may be configured to display an amount of time expected to fully charge an electronic device positioned within an associated charging region.

Furthermore, charging device 402 may be configured to audibly convey information related to one or more electronic devices 410 positioned within charging regions 406. More specifically, for example, interface 401 may be configured to audibly convey a device label (e.g., a user name), a device type (e.g., cell phone, camera, etc.), or any combination thereof, for a specific electronic device. Furthermore, interface 401 may be configured to audibly convey information indicative of whether the specific electronic device is being charged, an amount of charge existing within the specific electronic device at a moment in time, or any combination thereof. In addition, interface 401 may be configured to audibly convey information indicating that the specific electronic device is fully charged or an amount of time expected to fully charge the specific electronic device. As an example, interface 401 may be configured to audibly identify electronic device 410B (e.g., audibly convey "Joe's camera") positioned within charging region 406B and audibly convey a charging status of electronic device 410B (e.g., audibly convey "charging"). Additionally, as depicted in FIG. 13, interface 401 may include a display region 413 configured to display information, which may or may not be related to an electronic device positioned within a charging region. For example only, display region 413 may be configured to display a date and time.

Charging device 402 may also be configured to vibrate an electronic device in one of a plurality of patterns to indicate a charging status of the electronic device. As an example, charging device 402 may be configured to vibrate electronic device 410C in a first pattern to indicate that electronic device 410C is charging. Further, charging device 402 may be configured to vibrate electronic device 410A in a second pattern to indicate that electronic device 410A is fully charged.

Although charging device 402 is illustrated as having a ledge 415 configured for placement of one or more electronic devices, embodiments of the present invention are not so limited. Rather, charging device 402 may comprise any physical configuration so as to enable one or more electronic devices to be placed within a charging region. For example, charging device 402 may be configured in a manner so as to have a substantially horizontal surface configured for one or more electronic devices to be placed thereon. Furthermore, as described more fully below, charging device 402 may be implemented as a portable charging device (e.g., a bag) or a stationary charging device (e.g., a table).

Figure 14:
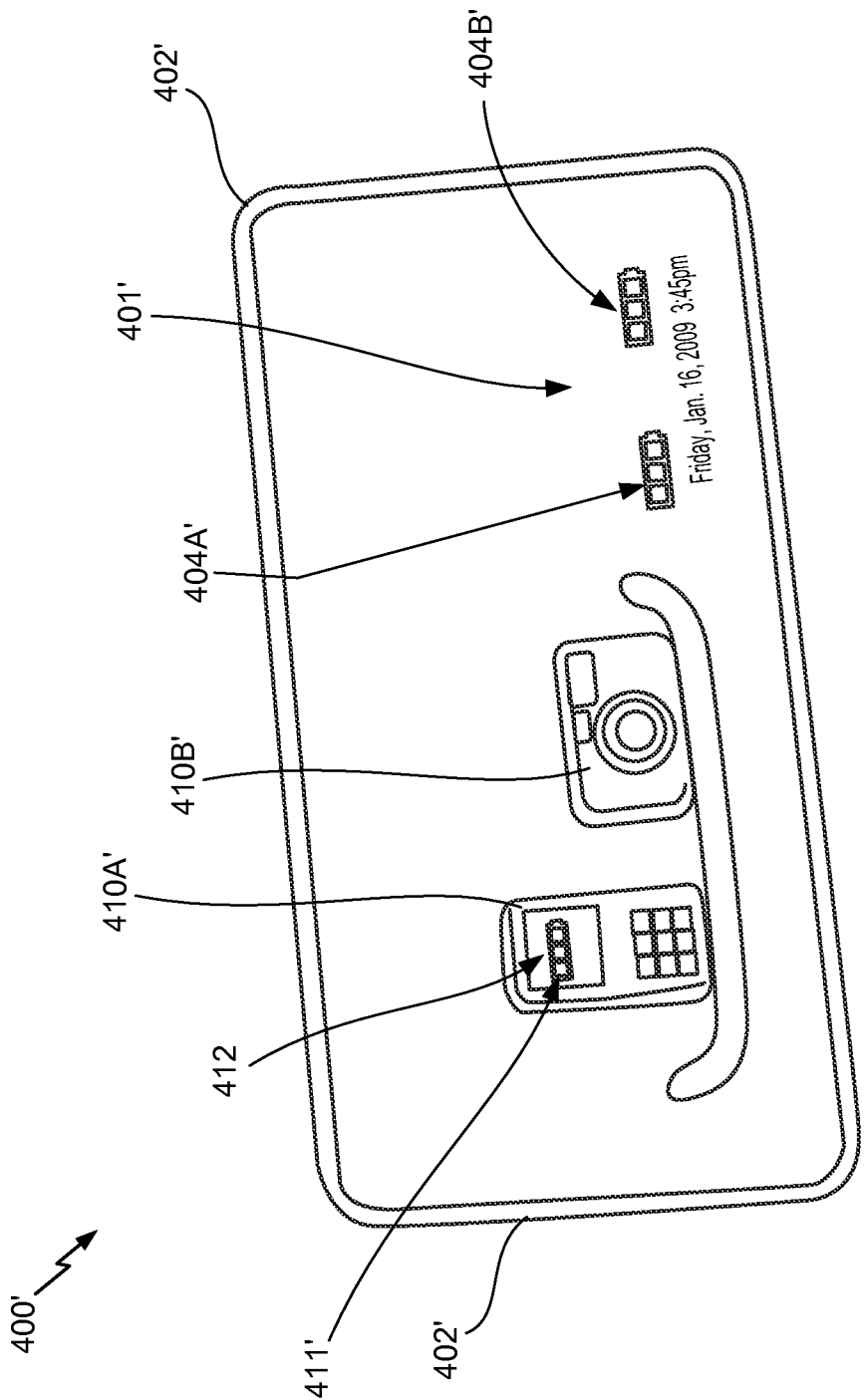
FIG. 14 illustrates a charging system including a charging device and at least one chargeable electronic device, in accordance with an exemplary embodiment of the present invention.

FIG. 14 illustrates a wireless charging system 400' including a charging device 402' and at least one chargeable electronic device 410' (e.g., electronic devices 410A' and 410B').

Charging device 402' is substantially similar to charging device 402 and, therefore, charging device 402' will not be described in further detail. In addition to having interface 401' including one or more indicator display 404' (i.e., indicator display 404A' and indicator display 404B') being configured to convey information relating to an electronic device positioned within an associated charging region, charging system 400' may include at least one chargeable electronic device 410A' having a display element 412. Display element 412 may be configured to display information relating to a charging status of electronic device 410A'. For example only, display element 412 may be configured to display one or more flashing lights within a progress indicator 411' to indicate that electronic device 410A' is being charged. Furthermore, as will be understood by a person having ordinary skill in the art, progress indicator 411' may be configured to indicate an amount of charge existing within electronic device 410A' at a moment in time. For example, display element 412 may be configured to display one flashing light within progress indicator 411' to indicate that electronic device 410A' is being charged and has "one bar" worth of stored charge. Accordingly, as illustrated in FIG. 14, a charging status of an electronic device (e.g., electronic device 410A') may be simultaneously displayed by each of an associated indicator display (e.g., indicator display 404A') and an associated display element (e.g., display element 412). As such, charging system 400' may be configured to provide independent verification of a charging status of a chargeable electronic device positioned within a charging region of a charging device.

Figure 15:
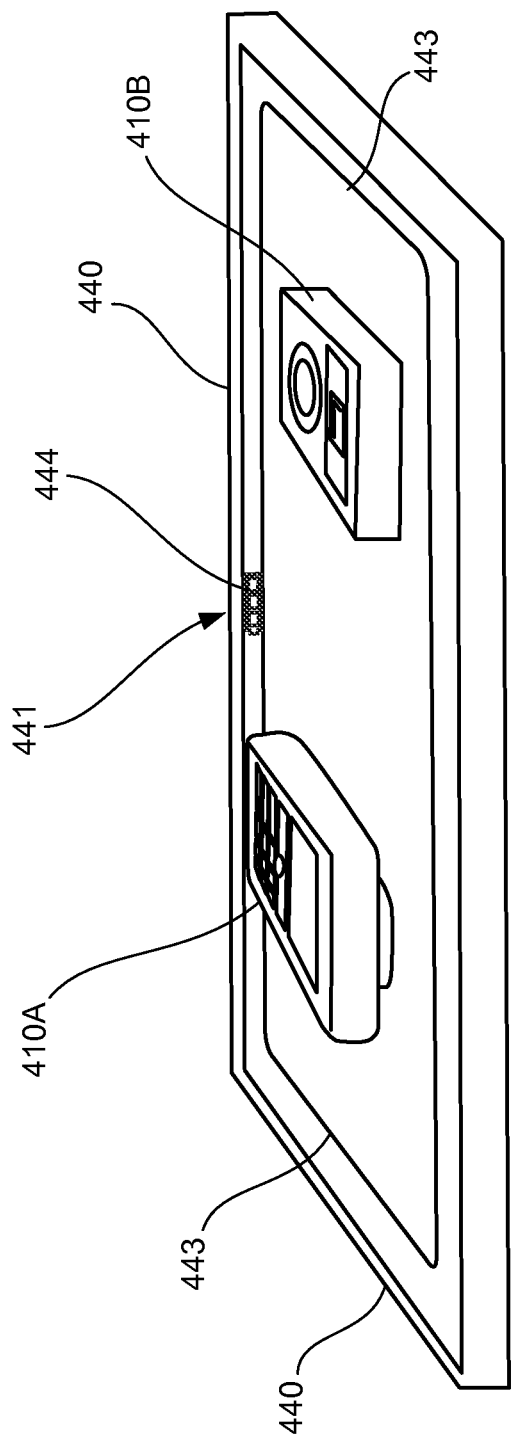
FIG. 15 illustrates a charging device including an interface having an indicator display, according to an exemplary embodiment of the present invention.

FIG. 15 illustrates another charging device 440 having an interface 441 including a indicator display 444, in accordance with an exemplary embodiment of the present invention. Charging device 440 may be configured to wirelessly charge at least one electronic device being positioned thereon. More specifically, charging device 440 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a battery (e.g., battery 136 depicted in FIG. 2) of an electronic device (e.g., electronic device 410A or electronic device 410B). Upon receipt of the wirelessly transmitted power at the receive antenna and the associated receiver, power may be supplied to the battery of the electronic device.

As illustrated in FIG. 15, charging device 440 includes interface 441 configured to convey information concerning a summary of all electronic devices positioned within a charging region 443 of charging device 440. Specifically, indicator display 444 may be configured to display information related to a summary of the charging statuses of electronic device 410A and electronic device 410B, each positioned within charging region 443. For example only, indicator display 444 may be configured to display one or more lights flashing in a first pattern to indicate that at least one of electronic device 410A and electronic device 410B is being charged, or that both electronic device 410A and electronic device 410B are being charged. Furthermore, indicator display 444 may be configured to display, for example only, one or more uninterrupted lights to indicate that both electronic device 410A and electronic device 410A are fully charged. Moreover, indicator display 444 may be configured to display, for example only, one or more lights flashing in another pattern to indicate that charging region 443 does not include at least one chargeable device. Additionally, indicator display 444 may be configured to display, for example only, one or more lights flashing in yet another pattern to indicate that charging region 443 includes one or more detectable, but non-chargeable devices, as described more fully below.

Furthermore, according to one exemplary embodiment, charging device 440 may be configured to audibly convey information related to a summary of the charging statuses of all electronic devices positioned within a charging region 443. For example only, interface 441 may be configured to convey audio in a first form (e.g., a beep) to indicate that at least one of electronic device 410A and electronic device 410B is being charged, or that both electronic device 410A and electronic device 410B are being charged. Furthermore, for example only, interface 441 may be configured to convey audio in a second form (e.g., a chime) to indicate that both electronic device 410A and electronic device 410A are fully charged. Moreover, for example only, interface 441 may be configured to convey audio in a third form (e.g., a buzz) to indicate that charging region 443 does not include at least one chargeable device. Additionally, for example only, interface 441 may be configured to convey audio in a fourth form (e.g., a ring) to indicate that charging region 443 includes one or more detectable, but non-chargeable devices, as described more fully below.

Figure 16:
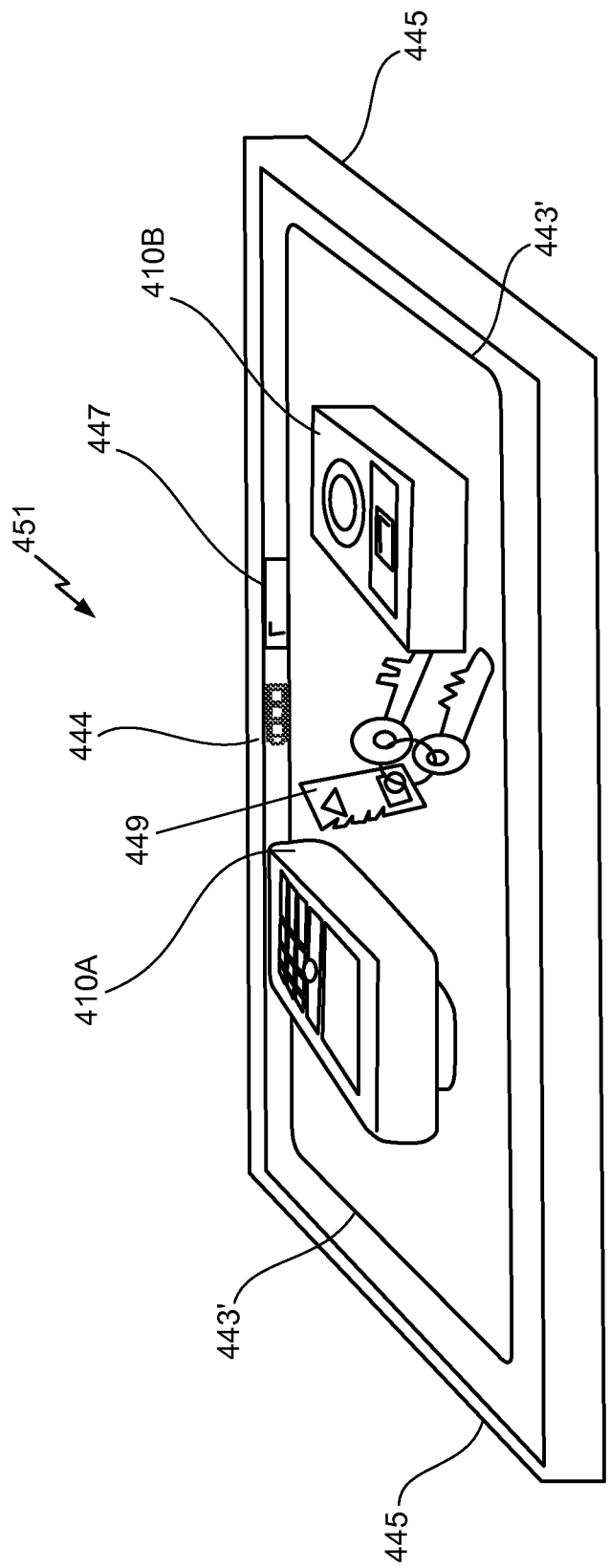
FIG. 16 illustrates another charging device including an interface having at least one indicator display, in accordance with an exemplary embodiment of the present invention.

Another charging device 445, in accordance with an exemplary embodiment of the present invention, is illustrated in FIG. 16. Charging device 445 is substantially similar to charging device 440 and, therefore, charging device 445 will not be described in complete detail. In addition to being configured to convey information concerning a summary of the chargeable electronic devices positioned within a charging region 443' (e.g., electronic device 410A and electronic device 410B), charging device 445 may be configured to detect the presence of a detectable, but non-chargeable device (e.g., non-chargeable device 449) positioned within charging region 443'. For example, charging device 445 may be configured to detect the presence of an electronic device that lacks an appropriate receiver for receiving power wirelessly transmitted from a transmitter within charging device 445. As another example, charging device 445 may be configured to detect the presence of a radio-frequency identification (RFID) tag connected to a device, such as a smart card, within charging region 443'.

Furthermore, charging device 445 may be configured to convey information to indicate that charging region 443' includes one or more non-chargeable devices. In addition to having an interface 451 including indicator display 444, interface 451 may include an indicator display 447 configured to display information related to one or more non-chargeable devices positioned within charging region 443'. Specifically, for example, indicator display 447 may be configured to display one or more lights flashing in a distinguishable pattern to indicate that charging region 443' includes non-chargeable device 449 positioned therein. Additionally, for example only, charging device 445 may be configured to convey audio in one of a plurality of forms to indicate that charging region 443' includes non-chargeable device 449.

Figure 17:
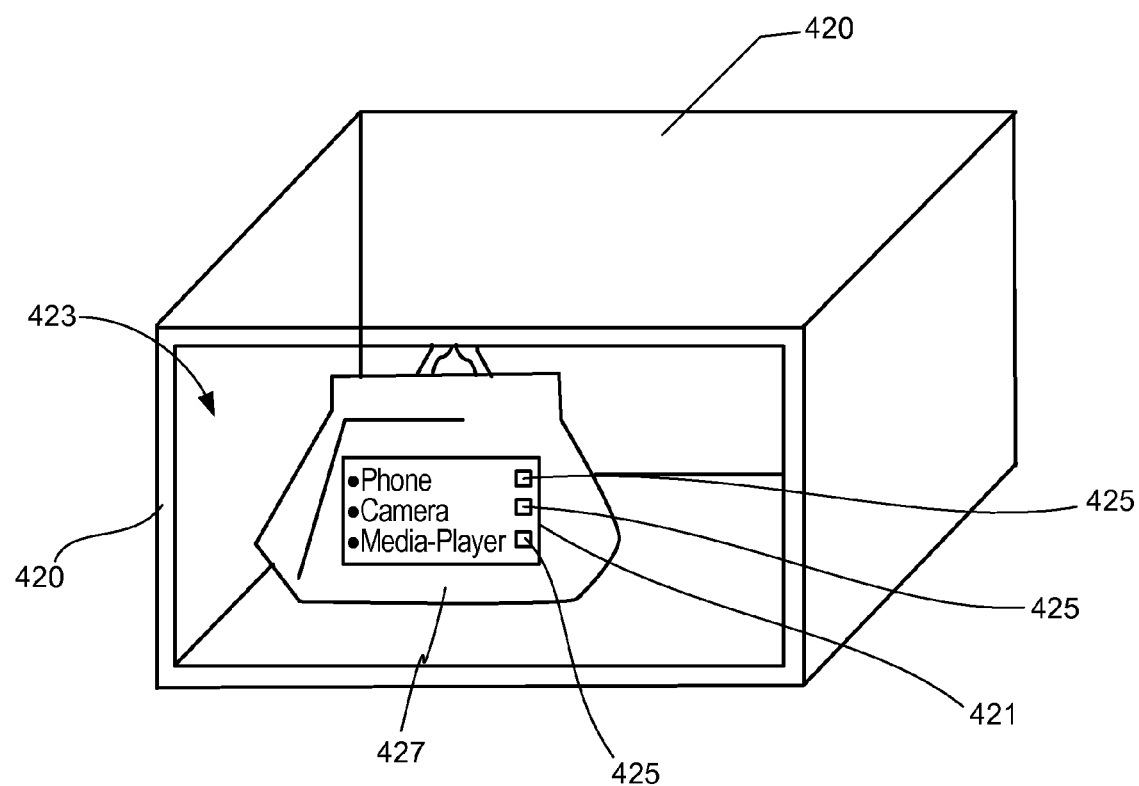
FIG. 17 illustrates a charging device including an internal region and an interface, according to an exemplary embodiment of the present invention.

FIG. 17 illustrates another charging device 420 having at least one interface 421, according to an exemplary embodiment of the present invention. Charging device 420 may be configured to wirelessly charge at least one electronic device being positioned within an internal region 423. More specifically, charging device 420 may include at least one transmit antenna (e.g., transmit antenna 114 depicted in FIG. 2) configured to wirelessly transmit power to a receive antenna (e.g., receive antenna 118 depicted in FIG. 2) and an associated receiver (e.g., receiver 108 depicted in FIG. 2) coupled to a battery (e.g., battery 136 depicted in FIG. 2) of an electronic device positioned within internal region 423. However, embodiments of the present invention are not so limited. In the exemplary embodiments described herein, multi-dimensional regions with multiple antennas may be performed by the techniques described herein. In addition, multi-dimensional wireless powering and charging may be employed, such as the means described in U.S. patent application Ser. No. 12/567,339, entitled "SYSTEMS AND METHOD RELATING TO MULTI-DIMENSIONAL WIRELESS CHARGING" filed on Sep. 25, 2009, the contents of which are hereby incorporated by reference in its entirety for all purposes. Upon receipt of the wirelessly transmitted power at the receive antenna and the associated receiver, power may be supplied to the battery of the electronic device.

As illustrated in FIG. 17, charging device 420 includes interface 421 positioned on an exterior surface of charging device 420 and configured to convey graphics, alphanumeric text, or any combination thereof. Interface 421 may be configured to convey information relating to one or more electronic devices positioned within a charging region (i.e., internal region 423) of charging device 420. Specifically, for example, interface 421 may be configured to convey an identifier of electronic device positioned within associated charging region. For example, interface 421 may be configured to display a device label (e.g., a user name), a device type (e.g., cell phone, camera, etc.), or any combination thereof. As a non-limiting example, if a cellular telephone is positioned within a charging region of charging device 420, interface 421 may be configured to display alphanumeric text (e.g., "Phone") identifying the cellular telephone positioned within the charging region of charging device 420.

Further, interface 421 may be configured to convey information related to a charging status of one or more electronic devices positioned within the charging region of charging device 420. For example, according to one exemplary embodiment, interface 421 may be configured to display one or more lights in display elements 425, positioned proximate a device identifier (e.g., "Camera"), in a distinguishable pattern to indicate whether an associated electronic device within the charging region of charging device 420 is being charged. In addition, interface 421 may be configured to display one or more lights in another distinguishable pattern to indicate that an associated electronic device within a charging region of charging device 420 is fully charged. Furthermore, for example, interface 421 may be configured to display one or more continuous lights associated with a device identifier to indicate that the electronic device is fully charged.

In addition, charging device 420 may be configured to convey audio. More specifically, for example, interface 421 may be configured to audibly convey an identifier such as a device label (e.g., a user name), a device type (e.g., cell phone, camera, etc.), or any combination thereof. Additionally, interface 421 may be configured to audibly convey information indicative of whether an associated electronic device positioned within a charging region of charging device 420 is being charged or whether an associated electronic device positioned within the charging region of charging device 420 is fully charged. As a non-limiting example, if a camera is positioned within the charging region of charging device 420, interface 421 may be configured to audibly identify the camera (e.g., audibly convey "camera") and audibly convey a charging status of the camera (e.g., audibly convey "charged").

It is noted that although the exemplary embodiments described above depict one or more devices (i.e., chargeable electronic devices and/or non-chargeable devices) positioned directly on a surface of a charging device, embodiments of the present invention are not so limited. Rather, the charging devices described above may be configured to charge and convey information concerning any chargeable electronic device positioned within a near-field of a transmit antenna integrated within the charging device. Accordingly, as an example, any one of the charging devices described above may be configured to charge and convey information concerning a chargeable electronic device that is positioned within a portable device such as, for example, a purse, a backpack, or a briefcase. Stated another way, a portable device (e.g., a bag) having a chargeable electronic device therein may be placed in and/or on any of the charging devices, as described hererin, and the charging device may charge and convey information identifying the chargeable electronic device and a charging status of the chargeable electronic device. As an example, with reference to FIG. 17, charging device 420, and more specifically interface 421, may be configured to convey information concerning one or more chargeable electronic devices positioned within a portable device 427, such as a bag, which is positioned within internal region 423 of charging device 420.

Furthermore, it is noted that a portable device (e.g., portable device 427) may include a repeater antenna, as described above, and, therefore, one or more chargeable electronic devices within the portable device may be charged via a charging device having a transmit antenna (e.g., charging device 420) and portable device having a repeater antenna (e.g., portable device 427). It is further noted that each charging device as described herein may be implemented as, for example only, a portable charging device such as a backpack, a briefcase, a purse, clothing, luggage, etc. Accordingly, portable device 427, as described with reference to FIG. 17 may also include an interface, such as interface 401, interface 401', interface 441, or interface 451, as described herein. Furthermore, each charging device described herein may be implemented as, for example, a stationary charging device such as a table, a desk, or any other stationary furniture.

Figure 18:
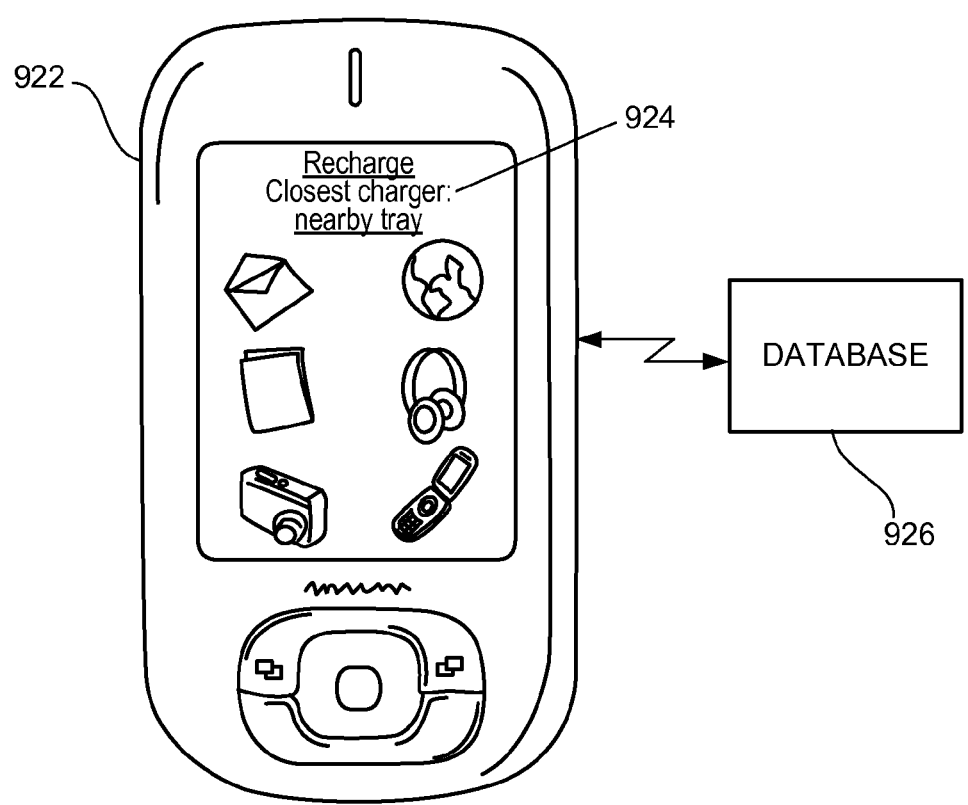
FIG. 18 illustrates an electronic device including a display element, according to an exemplary embodiment of the present invention.

FIG. 18 illustrates a wirelessly chargeable electronic device 922. Device 922 may comprise any wirelessly chargeable electronic device such as, for example only, a cellular telephone, a portable media player, a camera, or any combination thereof. Device 922 may include an interface 924 and may be configured to convey a visible and/or an audible message to alert a device user that device 922 needs to be charged. More specifically, when an amount of available power stored in device 922 drops to or below a specific threshold level, device 922 may display and/or audibly convey an alert (e.g. a beep) to notify the user that device 922 requires charging. It is noted that the threshold level may be determined based on an amount of power available in a battery of device 922, an amount of battery time remaining based on user usage patterns and power consumption of device 922, or any combination thereof.

Furthermore, in accordance with an exemplary embodiment of the present invention, device 922 may be configured to audibly convey and/or display information concerning one or more wireless chargers, which may be configured to wirelessly charge device 922. More specifically, in one exemplary embodiment, device 922 may be configured to display a map illustrating locations of one or more wireless chargers configured to wirelessly charge device 922. In another exemplary embodiment, device 922 may be configured to provide a location, via text and/or an audible message, of one or more wireless chargers configured to wirelessly charge device 922. Furthermore, in another exemplary embodiment, device 922 may be configured to audibly convey and/or display navigational directions to the one or more wireless chargers.

As a non-limiting example, device 922 may be configured to provide a user with a location of, and navigation directions to, one or more wireless chargers that are closest to device 922. As a more specific example, and, as illustrated in FIG. 18, device 922 may be configured to display an alert (e.g., "Recharge") and provide a link ("nearby tray") to information (e.g., location, map, and/or navigational directions) concerning a nearby wireless charger. It is noted that device 922 may be configured to obtain information concerning wireless charger locations via any known and suitable detection means and/or through a populated database 926.

Figure 19:
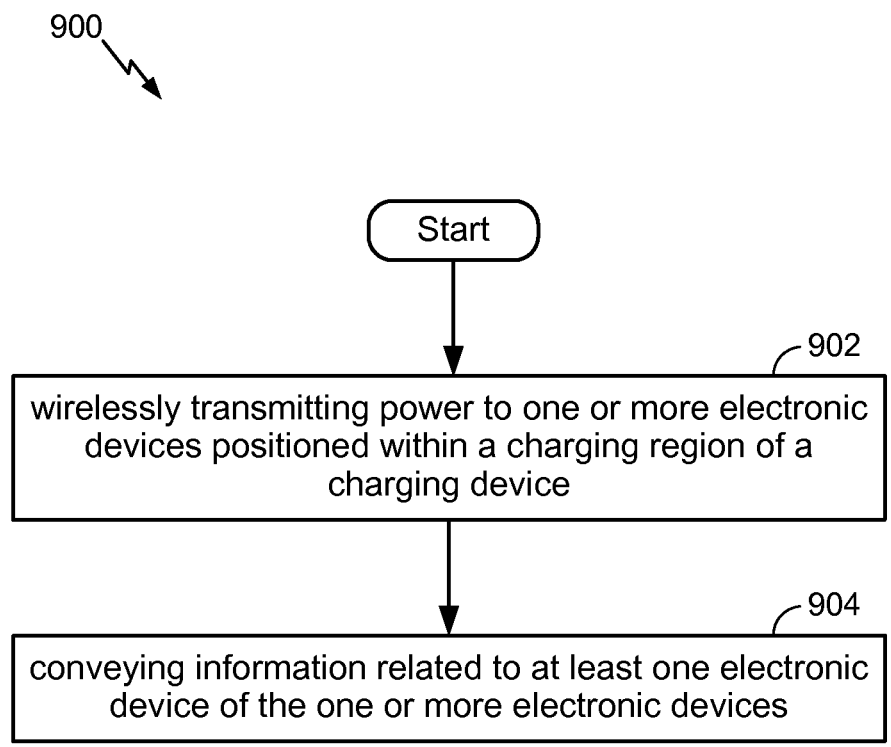
FIG. 19 is a flowchart illustrating a method of operating a charging device, in accordance with an exemplary embodiment of the present invention.

FIG. 19 is a flowchart illustrating a method 900 of operating a wireless charging device, in accordance with one or more exemplary embodiments. Method 900 may include wirelessly transmitting power to one or more electronic devices positioned within a charging region of a charging device (depicted by numeral 902). Method 900 may further include conveying information related to at least one electronic device of the one or more electronic devices (depicted by numeral 904).

Figure 20:
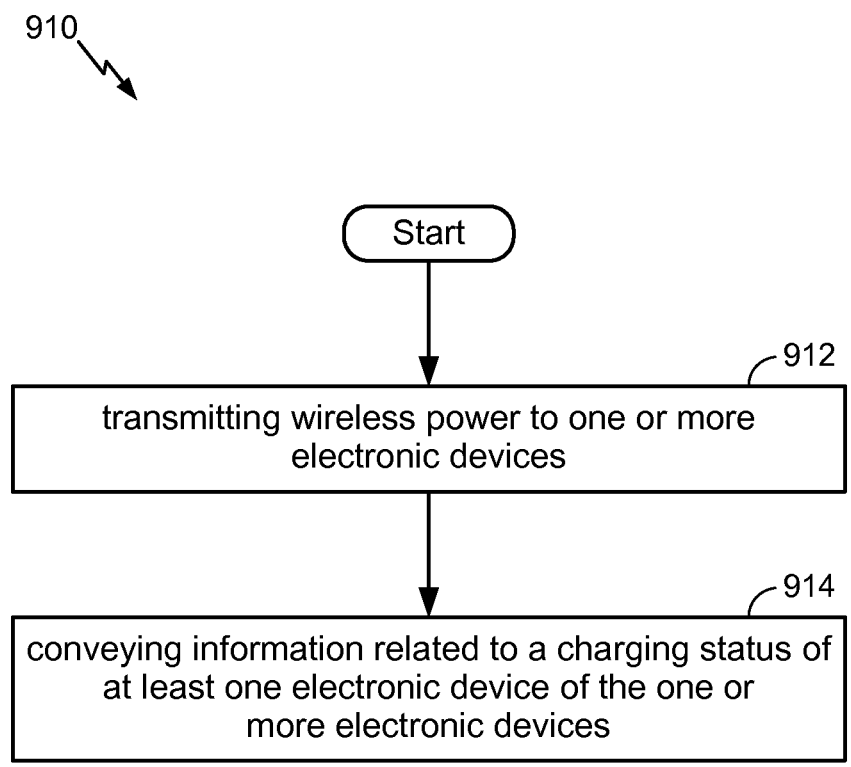
FIG. 20 is a flowchart illustrating another method of operating a charging device, in accordance with an exemplary embodiment of the present invention.

FIG. 20 is a flowchart illustrating another method 910 of operating a wireless charging device, according to one or more exemplary embodiments. Method 910 may include transmitting wireless power to one or more electronic devices (depicted by numeral 912). Furthermore, method 910 may include conveying information related to a charging status of at least one electronic device of the one or more electronic devices (depicted by numeral 914).

Various exemplary embodiments of the present invention, as described herein, may enable a user of a charging device, as described above, to be informed of a charging status of one or more electronic devices, which are positioned within a charging region of the charging device, and which may or may not be visible to the user.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A charging device configured to wirelessly charge or power one or more electronic devices, the charging device comprising:
   a power transmitter configured to wirelessly transmit power at a level sufficient to wirelessly charge or power the one or more electronic devices; and
   an interface housed with the power transmitter and configured to convey information to a user, the information indicative of a power storage level of at least one electronic device of the one or more electronic devices.

2. The charging device of claim 1, further comprising an enclosure configured to receive the one or more electronic devices.

3. The charging device of claim 1, wherein the interface comprises at least one indicator display, each indicator display of the at least one indicator display associated with a different respective electronic device of the one or more electronic devices.

4. The charging device of claim 1, wherein the interface comprises at least one indicator display configured to display one of graphics or alphanumeric text.

5. The charging device of claim 1, wherein the interface is further configured to display an alphanumeric identifier identifying an electronic device of the one or more electronic devices.

6. The device of claim 5, wherein the alphanumeric identifier is received from the one or more electronic devices.

7. The charging device of claim 1, wherein the information indicative of the power storage level is further indicative of progress of a charging process of the at least one electronic device.

8. The charging device of claim 1, wherein the interface is configured to display the information indicative of the power storage level or audibly convey the information indicative of the power storage level.

9. The charging device of claim 1, wherein the interface is further configured to audibly convey one of a device label or a device type of the one or more electronic devices.

10. The charging device of claim 1, wherein the interface comprises an indicator display configured to display one or more lights indicating the power storage level of the at least one electronic device and wherein the indicator display is further configured to indicate that the at least one electronic device is fully charged, that the at least one electronic device is charging, or that no electronic device is charging.

11. The charging device of claim 1, further comprising a detection component configured to detect at least one non-chargeable device within a charging region of the charging device, wherein the interface is further configured to display information relating to the non-chargeable device to the user.

12. The device of claim 1, wherein the information indicative of the power storage level is received from the at least one electronic device.

13. A charging system, comprising:
   an electronic device comprising a display configured to display a power storage level of the electronic device; and
   a charging device comprising:
      a power transmitter configured to wirelessly transmit power at a level sufficient to wirelessly charge or power the electronic device; and
      an interface configured to display the power storage level of the electronic device.

14. The charging system of claim 13, wherein each of the display and the interface is configured to display a progress indicator having a plurality of lights configured to display the power storage level.

15. A method of operating a charging device, comprising:
   wirelessly transmitting power at a level sufficient to power or charge one or more electronic devices; and
   conveying information at a transmitter to a user, the information indicative of a power storage level of at least one electronic device of the one or more electronic devices.

16. The method of claim 15, further comprising audibly conveying one of a device label or a device type of the at least one electronic device of the one or more electronic devices.

17. The method of claim 15, further comprising displaying one of a device label or a device type of the at least one electronic device of the one or more electronic devices.

18. The method of claim 15, further comprising vibrating the at least one electronic device of the one or more electronic devices in one of a plurality of patterns to indicate a charging status of the at least one electronic device.

19. The method of claim 15, wherein conveying information comprises displaying information in an indicator display.

20. The method of claim 15, further comprising detecting at least one non-chargeable device and conveying information related to the at least one non-chargeable device to a user.

21. The method of claim 15, further comprising receiving the information indicative of the power storage level from the at least one electronic device.

22. A charging device, comprising:
   means for wirelessly transmitting power at a level sufficient to charge or power one or more electronic devices; and
   means for conveying information at the wireless transmitting means to a user, the information indicative of a power storage level of at least one electronic device of the one or more electronic devices.

23. The charging device of claim 22, further comprising means for receiving the information indicative of the power storage level from the at least one electronic device.

24. The charging device of claim 22, wherein the means for conveying information to the user comprises one of means for displaying the information indicative of the power storage level or means for audibly conveying the information indicative of the power storage level.

25. The charging device of claim 22, further comprising means for detecting at least one non-chargeable device within a charging region of the charging device and means for displaying information relating to the non-chargeable device.

26. An electronic device, comprising:
   means for wirelessly receiving power from a wireless charger at a level sufficient to power or charge a component of the electronic device;
   means for conveying information to a user, the information indicative of a power storage level of the electronic device; and
   means for conveying information relating to the wireless charger to the user.

27. The electronic device of claim 26, wherein the information relating to the wireless charger comprises one of a map illustrating a location of the wireless charger, navigational directions to the wireless charger, or a location of the wireless charger.

28. The electronic device of claim 26, wherein the means for conveying information relating to the wireless charger comprises one of means for audibly conveying the information relating to the wireless charger or means for displaying the information relating to the wireless charger.

29. The electronic device of claim 26, wherein the wireless charger is one of a plurality of wireless chargers, and wherein the wireless charger is positioned in a closer location to the electronic device as compared to the other of the plurality of wireless chargers.

30. An apparatus for wirelessly receiving power, the apparatus comprising:
- a power receiver configured to wirelessly receive power from a wireless charger; and
- an interface configured to:
  - convey information indicative of a power storage level to a user; and
  - convey information relating to the wireless charger to the user.

31. The apparatus of claim 30, wherein the information relating to the wireless charger comprises one of a map illustrating a location of the wireless charger, navigational directions to the wireless charger, or a location of the wireless charger.

32. The apparatus of claim 30, wherein the interface is configured to audibly convey the information relating to the wireless charger or display the information relating to the wireless charger.

33. The apparatus of claim 30, wherein the wireless charger is one of a plurality of wireless chargers, and wherein the wireless charger is in a position closer to the power receiver as compared to the other of the plurality of wireless chargers.

34. A method of wirelessly receiving power at an electronic device, the method comprising:
- conveying information indicative of a power storage level of the electronic device to a user; and
- conveying information relating to a wireless charger to a user, the electronic device configured to wirelessly receive power from the wireless charger.

35. The method of claim 34, wherein the information relating to the wireless charger comprises one of a map illustrating a location of the wireless charger, navigational directions to the wireless charger, or a location of the wireless charger.

36. The method of claim 34, wherein conveying information relating to the wireless charger comprises one of audibly conveying the information relating to the wireless charger or displaying the information relating to the wireless charger.

37. The method of claim 34, wherein the wireless charger is one of a plurality of wireless chargers, and wherein the wireless charger is in a position closer to the electronic device as compared to the other of the plurality of wireless chargers.

* * * * *